(12) United States Patent
Joshi et al.

(10) Patent No.: US 12,248,691 B2
(45) Date of Patent: Mar. 11, 2025

(54) ARCHITECTURE FOR A MULTI-RESOLUTION, IN-FLIGHT AND PROGRAMMABLE ANALYTICS PLATFORM

(71) Applicant: NetScout Systems, Inc., Westford, MA (US)

(72) Inventors: Amogh N. Joshi, Pune (IN); Anil K. Singhal, Carlisle, MA (US); Rajeev P. Nadkarni, Chelmsford, MA (US); Narendra R. Byrapuram, Westford, MA (US)

(73) Assignee: NetScout Systems, Inc., Westford, MA (US)

( * ) Notice: Subject to any disclaimer, the term of this patent is extended or adjusted under 35 U.S.C. 154(b) by 161 days.

(21) Appl. No.: 18/297,838

(22) Filed: Apr. 10, 2023

(65) Prior Publication Data
US 2024/0272819 A1 Aug. 15, 2024

(30) Foreign Application Priority Data
Feb. 15, 2023 (IN) .............................. 202341010059

(51) Int. Cl.
*G06F 16/00* (2019.01)
*G06F 3/06* (2006.01)

(52) U.S. Cl.
CPC ............ *G06F 3/064* (2013.01); *G06F 3/0659* (2013.01); *G06F 3/0604* (2013.01); *G06F 3/0679* (2013.01)

(58) Field of Classification Search
CPC .... G06F 16/25; G06F 21/604; G06F 21/6227; G06F 2221/2113; G06F 2221/2141; G06F 3/0659; G06F 3/064; G06F 3/0679; G06F 3/0604; G06F 9/3877; G06F 9/3005; G06F 12/0802; G06F 16/221; G06F 9/3891; G06F 12/0815; G06F 16/2246; G06F 12/0842; G06F 16/254
See application file for complete search history.

(56) References Cited

U.S. PATENT DOCUMENTS

2021/0097047 A1\* 4/2021 Billa ................. G06F 9/3877
2023/0315893 A1\* 10/2023 Levandoski ........... G06F 16/25
726/27

\* cited by examiner

*Primary Examiner* — Yicun Wu
(74) *Attorney, Agent, or Firm* — Foley & Lardner LLP

(57) ABSTRACT

A method is disclosed. In the method, a data generation process can continuously generate data in real time. The data generation process can store the data into discrete data blocks. An analyzer process can run analytical queries on the data from the data blocks. After the analytics is complete for different data blocks, data can be removed from the respective data blocks. The empty data blocks can be returned back to the generation process for reuse. The data blocks can be shared resources between the generation and the analyzer processes. The data can be stored in a directly queryable format. Though at any given time a given analytical query can run on a single data block, the analyzer process can preserve certain important records from that data block to be used while analyzing subsequent data blocks at a later time.

20 Claims, 10 Drawing Sheets

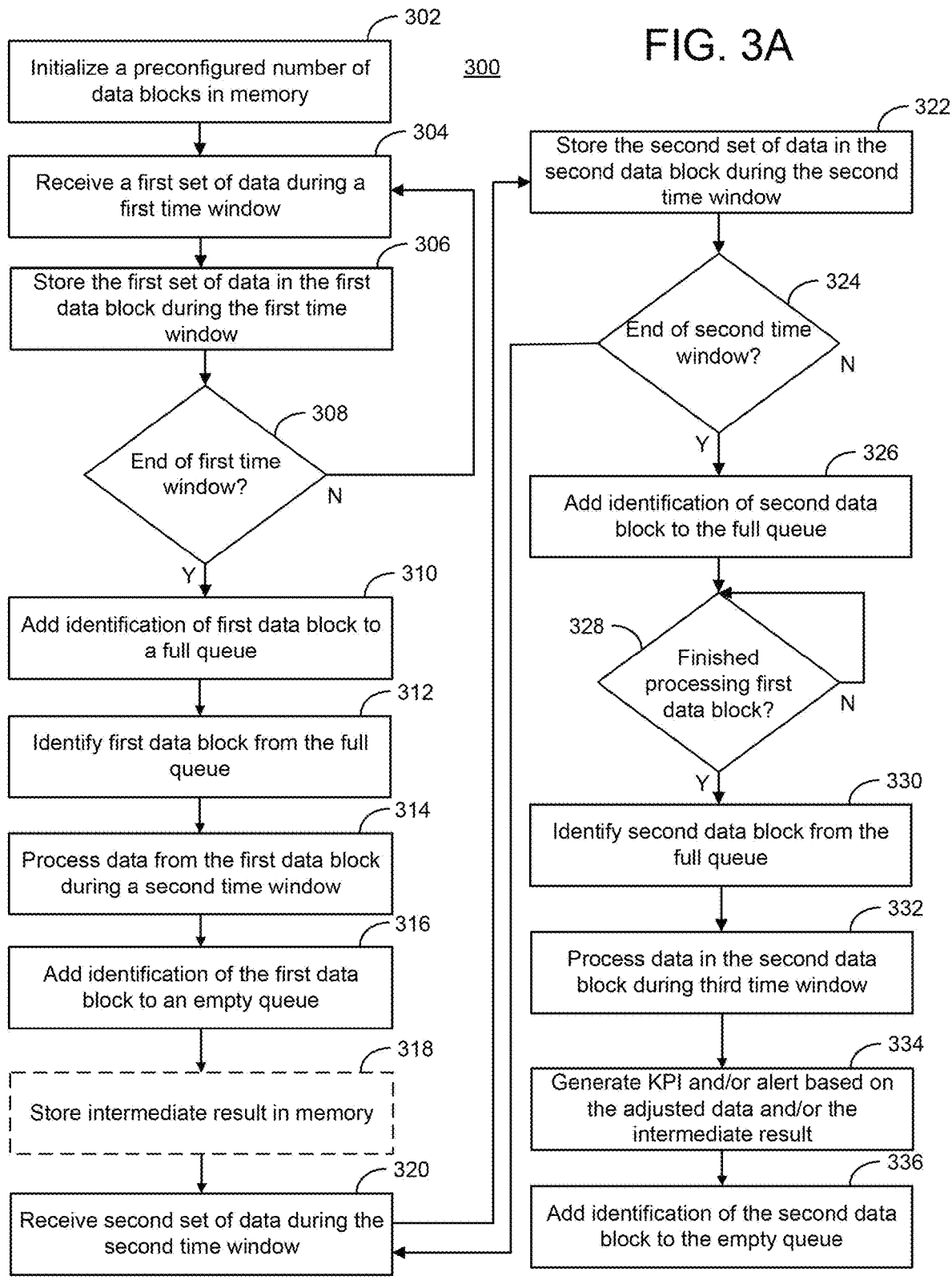

ARCHITECTURE FOR A MULTI-RESOLUTION, IN-FLIGHT AND PROGRAMMABLE ANALYTICS PLATFORM

CROSS-REFERENCE TO RELATED APPLICATIONS

This application claims the benefit of priority to Indian Provisional Application No. 202341010059, filed Feb. 15, 2023, the entirety of which is incorporated by reference herein.

BACKGROUND

Conventional analytics platforms/frameworks typically involve one or more data sources (e.g., a collection of records), a data store, and a query engine that operates on top of the data store (e.g., in an offline mode). Some platforms analyze individual records as the records are generated by a source (e.g., an in-line mode involving real-time data analysis). Analytics can often be diverse because they often require analyzing individual records (e.g., via condition matching, logical operators, pattern matching, etc.) and analyzing various types of aggregations (e.g., determining statistical operators, uniqueness, etc.) of individual records generated during short time windows. In some cases, analytics engines require visibility into larger time windows (e.g., for anomaly detection, classification, etc.).

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 3A is an illustration of a method for analyzing data in real time, in accordance with an implementation;

DETAILED DESCRIPTION

Figure 1:
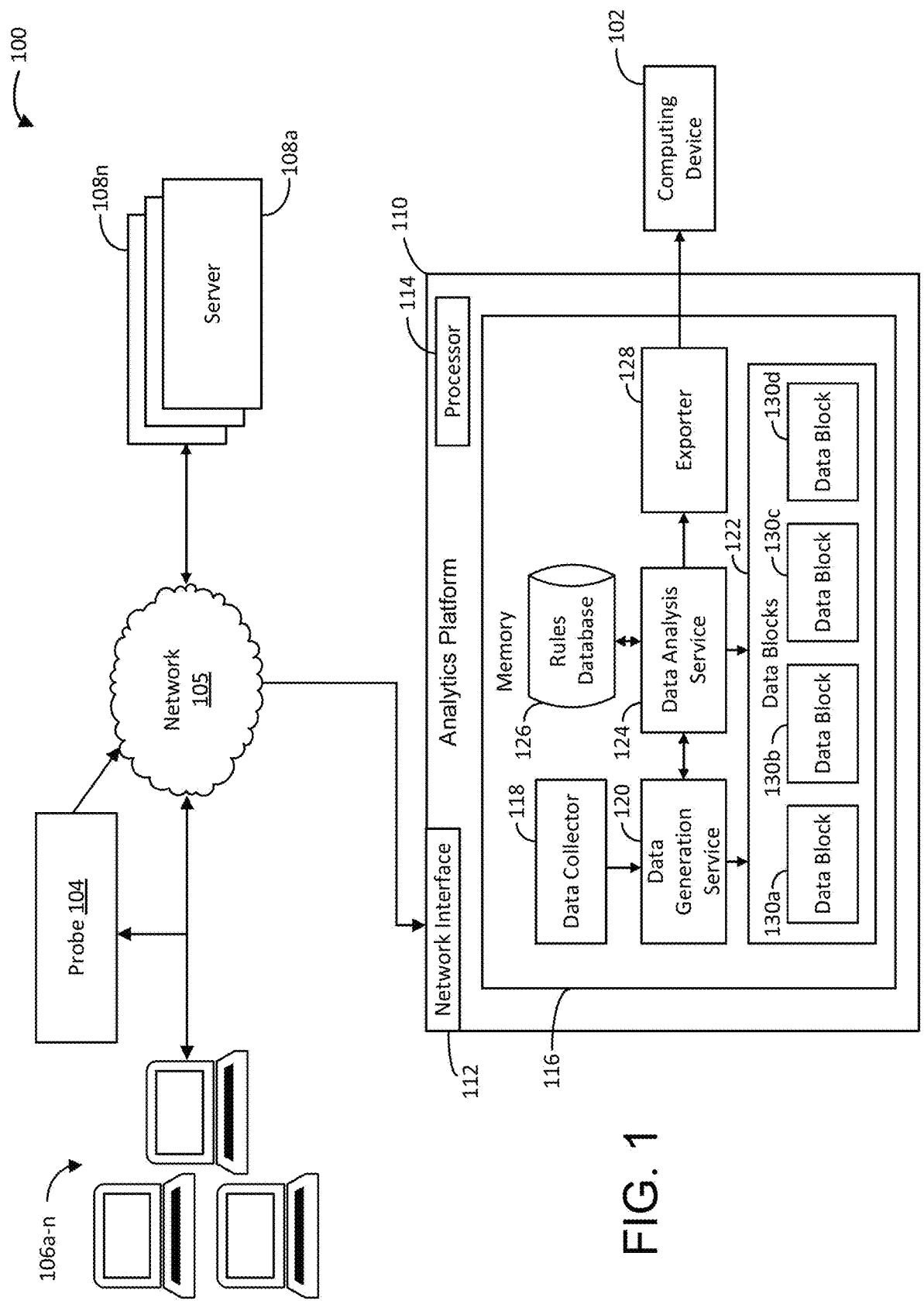
FIG. 1 is an illustration of an analytics system, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

As mentioned above, conventional data analytics systems may have difficulties processing real-time data in combination with data the analytics systems have previously stored. Conventional data analytics systems may have such difficulties because the systems may not have the storage capacity to store large amounts of data, and therefore outsource data storage to other data storage systems, such as cloud servers. When attempting to process data in real time based on real-time data and previously stored data, conventional data analytics servers typically exchange messages with the external storage computing devices. The exchange can cause the computing devices to perform their own queries and for the conventional data analytics servers to request specific data. Such communication can result in significant latency and incorrect or incomplete results because a data analytics server may not request the correct data for processing, the external data storage computing devices may experience an error, and/or the data analytics server may not identify the correct real-time data to use in combination with data retrieved from the external data sources for processing. This problem can be compounded when the data analytics server receives thousands of messages for processing, such as from a probe monitoring a 5G communication network, and the data analytics server must parse through each of the messages to generate key performance indicators (KPIs) and/or alerts. The amount of data involved in such processing can increase the probability of errors from missed data or that result from data becoming stale in short time frames.

Inline systems can be useful for analyzing individual records. However, such inline system can create challenges for the use cases which require visibility into a large number of records at the same time. Offline systems can be theoretically capable of addressing all the types of use cases. However, such offline system may need all the data to be ingested into the datastore which itself, which can create cost and performance challenges.

A computer implementing the systems and methods described herein may overcome the aforementioned technical deficiencies. For example, the computer may store multiple data blocks (e.g., files stored in memory (e.g., random access memory or on-disk memory) or in any other format). Each data block may be accessible to a data generation service and a data analysis service maintained by the computer. The computer may receive data in real time from another computing device, such as a probe monitoring communication sessions of a 5G communication network or an email server.

The data generation service may store the received data in a first data block for a first time window or until the first data block reaches the first data block's storage capacity. Subsequent to detecting the end of the first time window or that the storage capacity of the first data block has been reached, the data analysis service may process (e.g., query and/or analyze for KPIs and/or alerts) the first data block during a second time window. While the analysis service queries the first data block during the second time window, the data generation service may store data in a second data block during the second time window and/or until the second data block reaches a storage capacity. Upon detecting an ending to the second time window or detecting that the second data block has reached the block's storage capacity, the data generation service may transmit a message to the data analysis service that includes an identification of the second data block. The analysis service may receive the message and add the identification of the second data block to a queue. In some embodiments, the data generation service adds the second identification to the queue. The data generation service can transmit a message to the data analysis service indicating the second identification has been added to the queue or the data analysis service can detect the addition of the second identification in the queue. Upon finishing processing of the first data block, the analysis service may identify the identification of the second data block as the first identification in the queue and begin processing data in the second data block. The analysis service and/or the data generations service may remove the data from the first data block. The data generation service may store data in the first data block for a third window subsequent to the second time window while the data analysis service process data in the second data block. Accordingly, the computer may process real-time data in segments without transmitting any data to an external data source that would require a message exchange for retrieval at a later time.

In some cases, the analysis service may generate KPIs and/or alerts based on a combination of data from multiple data blocks. For example, when querying the data blocks during processing, the data analysis service may store intermediate results of the querying in memory as a lookback reference. The analysis service may later retrieve the intermediate results when querying a subsequent data block to process in combination with data retrieved from the subsequent data block.

The analysis service may generate KPIs and/or alerts when processing the data. For example, the analysis service may apply one or more rules to intermediate results and/or retrieved data from data blocks. In some cases, the computer may adjust the retrieved data and/or the intermediate results according to a function. The analysis service may identify any rules that are satisfied based on the data or the adjusted data to determine an alert or a KPI. Thus, the computer may concurrently process data of multiple time windows without relying on external data sources for storage.

The system architecture described herein can be an architecture for an analytics platform that combines the advantages of both the inline and the offline modes, shedding away their disadvantages, without compromising on programmability, flexibility, performance and scalability.

FIG. 1 illustrates an example analytics system 100 for analyzing real-time data and stored data, in some embodiments. The system 100 may provide improved data processing and data storage because the system removes the need to store data in external data lakes for data processing. In brief overview, the system 100 can include a probe 104 that receives and/or stores data packets transmitted via a network 105 between client devices 106a-n (hereinafter client device 106 or client devices 106) and servers 108a-n (hereinafter server 108 or servers 108). Client devices 106 can communicate with the service providers via the network 105. The servers 108 can each include a set of one or more servers 402, depicted in FIG. 4A, or a data center 408. The system 100 can also include an analytics platform 110 that can communicate or interface with the probe 104 and/or a computing device 102, either directly or via the network 105, to generate KPIs and/or alerts regarding the client devices 106. The analytics platform 110 may do so based on data packets the client devices 106 and the servers 108 transmit or exchange between each other. The analytics platform 110 can collect data from the probe 104 and generate KPIs regarding the client devices 106 and the connection between the client devices 106 and the servers 108 over the network 105. The analytics platform 110 can display the KPIs at the computing device 102.

The probe 104, the client devices 106, the servers 108, the computing device 102, and/or the analytics platform 110 can include or execute on one or more processors or computing devices (e.g., the computing device 403 depicted in FIG. 4C) and/or communicate via the network 105. The network 105 can include computer networks such as the Internet, local, wide, metro, or other area networks, intranets, satellite networks, and other communication networks such as voice or data mobile telephone networks. The network 105 can be or include a 5G network. The network 105 can be used to access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can stream videos in video sessions provided by one of the servers 108 or otherwise communicate with the servers of the servers 108. In some embodiments, the network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

Each of the computing device 102, the probe 104, the client devices 106, the servers 108, and/or the analytics platform 110 can include or utilize at least one processing unit or other logic device such as programmable logic array engine, or module configured to communicate with one another or other resources or databases. The components of the computing device 102, the probe 104, the client devices 106, the servers 108, and/or the analytics platform 110 can be separate components or a single component. The system 100 and its components can include hardware elements, such as one or more processors, logic devices, or circuits.

Still referring to FIG. 1, and in further detail, the system 100 can include the servers 108. The servers 108 may each be or include servers or computers configured to transmit or provide services across the network 105 to the client devices 106. The servers 108 may transmit or provide such services upon receiving requests for the services from any of the client devices 106. The term "service" as used herein includes the supplying or providing of information over a network, and is also referred to as a communications network service. Examples of services include 5G broadband services, any voice, data, or video service provided over a network, smart-grid network, digital telephone service, cellular service, Internet protocol television (IPTV), etc.

In one example, the servers 108 may include a producer node and a consumer node. The producer node may exchange (e.g., transmit) data packets with the consumer node. The data packets may be messages regarding individual client devices 106. For instance, the producer node may provide a service to a client device 106. The consumer node may transmit a data packet to the producer node subscribing to receive data regarding the service the producer node is providing to the client device 106. Based on receiving the subscription in the data packet, the producer node may transmit data packets to the consumer node regarding the service to the client device 106. For example, the producer node may provide a location-tracking service to a client device 106. In providing the service, the producer node may receive data regarding the location of the client device 106 at set intervals or upon querying the client device 106. The producer node may identify the locations and transmit the locations to the consumer node in data packets.

The client devices 106 can include or execute applications to receive data from the servers 108. For example, a client device 106 may execute a video application associated with a server 108 upon receiving a user input selection that causes the client device 106 to open the video application on the display. Responsive to executing the video application, the server 108 associated with the video application may stream a requested video to the client device 106 in a communication session. In another example, a client device 106 may execute a video game application associated with a server 108. Responsive to executing the video game application, the server 108 associated with the video game application may provide data for the video game application to the client device 106. The client devices 106 may establish communication sessions with servers for any type of application or for any type of call.

A client device 106 can be located or deployed at any geographic location in the network environment depicted in FIG. 1. A client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 410 depicted in FIG. 4B). If the client device 106 is deployed in a cloud 410, the client device 106 can include or be referred to as a virtual client device or virtual machine. In the event the client device 106 is deployed in a cloud 410, the packets exchanged between the client device 106 and one or more of the servers 108 can still be retrieved by a probe (e.g., the probe 104 or a different probe) from the network 105. The computing device 102 may be similar to a client device 106. In some cases, the probe 104, the client devices 106, and/or the analytics platform 110 can be deployed in the cloud 410 on the same computing host in an infrastructure 416 (described below with respect to FIG. 4).

As the servers 108 provide or transmit data in communication sessions to client devices 106 and between each other, the probe 104 may intercept or otherwise monitor the data packets that servers 108 transmit between each other and between the client devices 106. The probe 104 may comprise one or more processors that are connected to a network equipment manufacture (NEM) trace port of the network 105. In some embodiments, the probe 104 may collect control plane signaling data (Adaptive Service Intelligence (ASI) data) at an Evolved Packet Core interface (e.g., the S1-MME interface or the S6a interface) of the network 105. The control plane signaling data may include geographical location data (e.g., cell tower triangulation data or global positioning system data) of the client devices 106 as the client devices 106 receive data and/or transmit a cell identifier identifying the cell in which the respective client device 106 was located while transmitting or receiving the data, a device identifier (e.g., IMSI, MAC address, IP address, etc.) of the client device 106, dropped calls (e.g., disconnects from the streaming video provider), MAC PHY bandwidth, number of resource connection procedures a second, reference signals received power (RSRP), reference signal received quality (RSRQ), carrier to interference and noise ratio (CINR), handover information, timestamps indicating when the data was collected or generated, etc. The probe 104 may receive such data and forward the data to the analytics platform 110 over the network 105 for further processing.

The analytics platform 110 may comprise one or more processors that are configured to receive control plane signaling data and generate KPI data from the received control plane signaling data. The analytics platform 110 may comprise a network interface 112, a processor 114, and/or memory 116. The analytics platform 110 may communicate with any of the computing device 102, the probe 104, the client devices 106, and/or the servers 108 via the network interface 112. The processor 114 may be or include an ASIC, one or more FPGAs, a DSP, circuits containing one or more processing components, circuitry for supporting a microprocessor, a group of processing components, or other suitable electronic processing components. In some embodiments, the processor 114 may execute computer code or modules (e.g., executable code, object code, source code, script code, machine code, etc.) stored in the memory 116 to facilitate the operations described herein. The memory 116 may be any volatile or non-volatile computer-readable storage medium capable of storing data or computer code.

The memory 116 may include a data collector 118, a data generation service 120 data blocks 122, a data analysis service 124, a rules database 126, and an exporter 128, in some embodiments In brief overview, the components 118-128 may collect data packets transmitted between the client devices 106 and/or the servers 108. The components 118-128 may store the collected data packets or data from the data packets in different data blocks for different time windows. While storing data in one data block, the components 118-128 may process data from another data block to generate KPIs and/or alerts. The components 118-128 may create a queue of data blocks in cases in which a defined time window ends and the components 118-128 have not finished processing a data block. In such instances, the components 118-128 may finish processing the data in the data block and begin processing the data in the queued data block. The components may store the results of processing data in a data block to use in combination with data from another data block to generate KPIs or alerts. In this way, the components 118-128 may generate KPIs and/or alerts for large time windows and based on large amounts of data without individually storing all of the data or exporting the data to any data lakes for later retrieval.

The data collector 118 may comprise programmable instructions that, upon execution, cause the processor 114 to receive or collect data (e.g., data packets) from the probe 104. The data collector 118 may be an application programming interface (API). The data collector 118 may collect data from the probe 104, such as by communicating with an API stored by the probe 104. The data collector 118 may collect data by polling or receiving data from the probe 104. The data collector 118 may poll or receive data from the probe 104 at set intervals or pseudo-randomly. Upon receiving such data, the data collector 118 may transmit the data to the data generation service 120.

In some embodiments, the data collector 118 may collect types of data other than data packets from the probe 104. For example, the data collector 118 may collect Domain Name System logs, email logs, or any other types of real-time data. The data collector 118 may collect such data from the probe 104 and/or other computing devices that generate and/or transmit such data.

The data generation service 120 may comprise programmable instructions that, upon execution, cause the processor 114 to store data in the data blocks 122. In some embodiments, the data generation service 120 may be or include a network appliance in case of network deep packet inspection data (e.g., control plane signaling data or data plane data), an email server when the data collector 118 collects email logs, or any other application that collects data in real time. The data generation service 120 may receive the data from the data collector 118 over time as the data collector 118 collects data (e.g., collects data from the probe 104). The data generation service 120 may receive the data and insert the data into a data block 130*a-d* (hereinafter data blocks 130 or data block 130) of the data blocks 122.

The data blocks 130 of the data blocks 122 may be or include files stored in memory (e.g., in random access memory), on-disk, or in any other format. Each of the data blocks 130 may be accessible to both the data generation service 120 and the data analysis service 124. Each of the data blocks 130 may be stored in a location in the memory 116 (e.g., the data blocks 122) with an identification (e.g., a numeric or alphanumeric value) unique to the data block 130.

The data generation service 120 may store data in each data block for different time windows. For example, during a first time window, the data generation service 120 may receive data from the data collector 118 that the data collector 118 collects from the probe 104 during the first time window. The data generation service 120 may insert the received data into the data block 130*a*. The data generation service 120 may maintain a counter and/or a clock. Upon determining the counter reaches a defined value beginning at the beginning of the first time window or the clock reading the end of the first time window (e.g., reading a defined time indicating the end of the first time window), the data generation service 120 may stop inserting data from the data collector 118 into the data block 130*a*. The data generation service 120 may then begin inserting data received from the data collector 118 into the data block 130*b* for a second time window, which may begin after the first time window or begin at the end of the first time window. The data generation service 120 may insert data into any number of data blocks 130 for different time windows in this manner.

In some embodiments, instead of or in addition to the end of time windows, the data generation service 120 may stop inserting data into a data block 130 upon the respective data blocks reaching a storage capacity. For example, the data block 130*a* may have a storage capacity of one gigabyte. Upon storing one gigabyte of data in the data block 130*a*, the data generation service 120 may begin storing data in the data block 130*b*. The data generation service 120 may store data in the data block 130*b* until reaching the capacity of the data block 130*b* or upon reaching the end of the time window for the data block 130*a* or the time window for the data block 130*b*. The data generation service 120 may insert data into any number of data blocks 130 using such time windows and/or storage capacities in this manner.

In some embodiments, when storing the data in the data blocks 130, the data generation service 120 may store the data in a queryable format. The data generation service 120 may insert the data in the queryable format by inserting values for the data in the data blocks 130 as well as data types, sending devices, receiving devices, or any other data or metadata regarding the values. In some embodiments, the data generation service 120 may extract (e.g., using natural language processing techniques) values from documents or emails and insert the extracted values into the data blocks 130. The data analysis service 124 may query the data blocks 130 using data or metadata as a key to retrieve specific types of data based on the query. Accordingly, the data analysis service 124 may query the data blocks 130 without transforming the data in any manner, enabling the data analysis service 124 to perform data analytics of the data in the data blocks without copying the data to another location in memory.

The data analysis service 124 may comprise programmable instructions that, upon execution, cause the processor 114 to perform analytics on the data stored in the data blocks 130. The data analysis service 124 may query and/or retrieve data from the data blocks 130 that the data generation service 120 stored in the data blocks 130. In some embodiments, the data analysis service 124 queries a data block 130 (e.g., a first data block for a defined value or a defined data attribute (e.g., a type of data such as data from a particular node or computing device). In some embodiments, the data analysis service 124 queries the data block 130 by performing statistical operations, logical operations, mathematical operations, pattern matching operations, etc., on the data in the data block 130 and retrieving the results of such operations. The data analysis service 124 can query the data block 130 in any manner. The data analysis service 124 may retrieve the data and process the data using one or more functions to generate KPIs and/or alerts. The data analysis service 124 may retrieve data from one data block 130 after the data generation service 120 stores data in the data block 130 and while the data generation service 120 stores data in another data block 130.

Examples of KPIs include, but are not limited to, latency, number of connections, quality of the connections, volume of data transmitted, average connection time, cell PRB (physical resources blocks), resources consumed, etc. Other examples of KPIs may be related to connection quality such as min/max/average/mean and distribution of connection mean opinion score (MOS), connection drops, retransmissions, etc. An example of an alert may be an alert of a security breach. The data analysis service 124 may generate the KPIs or alerts for individual communication sessions, geographical areas in which individual nodes that are communicating and receiving data across the network 105 are located, types of devices, etc.

The data analysis service 124 may process data from data blocks 130 one at a time. For example, the data generation service 120 may store data in the data block 130*a* during a first time window. At termination of the first time window, the data generation service 120 may stop inserting data into the data block 130*a*. The data generation service 120 may begin inserting data into the data block 130*b* during a second time window subsequent to the first time window. The data analysis service 124 may begin processing (e.g., querying, adjusting, and/or analyzing) data in the data block 130*a* during the second time window. Upon finishing processing data from the data block 130*a* and the data analysis service 124 stopping inserting data into the data block 130*b*, the data analysis service 124 may begin processing the data in the data block 130*b*.

The data analysis service 124 may process data in data blocks 130 for any number of data blocks. For example, the data generation service 120 may store data in the data block 130*a* (e.g., a first data block) during a first time window, the data block 130*b* (e.g., a second data block) during a second time window, the data block 130*c* (e.g., a third data block) during a third time window, and the data block 130*d* (e.g., a fourth data block) during a fourth time window. The first through fourth time windows may be sequential to each other. The data analysis service 124 may process the data in the data block 130*a* during the second time window, then the data in the data block 130*b* during the third time window, then the data in the data block 130*c* during the fourth time window, and then the data in the data block 130*d* during a fifth time window. The data analysis service 124 may process data for any number of data blocks 130 in this manner.

The data analysis service 124 may remove data from a data block 130. For example, upon finishing processing the data stored in a data block 130*a*, the data analysis service 124 may remove the data from the data block 130*a*. The data analysis service 124 may transmit a message to the data generation service 120 identifying the data block 130*a* and indicating data has been removed from the data block 130*a*, thus indicating to the data generation service 120 that the data block 130*a* is available for reuse during the next or a subsequent time window. The data generation service 120 may receive the message and insert data into the data block 130*a* subsequent to finishing inserting data into another data block 130.

The data generation service 120 and/or the data analysis service 124 may maintain a queue. The queue may be a queue of data blocks 130 for processing. For example, the data generation service 120 and the data analysis service 124 may operate to store data in the data blocks 130 and process the stored data in the data blocks 130 irrespective of each other. For instance, the data generation service 120 may store data in the individual data blocks 130 for different time windows and/or until reaching a storage capacity while the data analysis service 124 may process data in the respective data blocks 130 for which the data generation service 120 had previously stored data. It may take longer to process data of a data block 130 than a time window or time until reaching a storage capacity of a data block 130, so the data analysis service 124 may continue processing data of a data block 130 while the data generation service 120 stops storing data in one data block 130 and begins storing data in another data block 130.

To account for such asynchronized processing, upon stopping inserting data into a data block 130, the data generation service 120 may transmit a message to the data analysis service 124 identifying the data block 130. The data analysis service 124 may receive the message and add the identification (e.g., the first identification or a second identification) of the data block 130 to a queue (e.g., a list stored in memory). The data analysis service 124 may similarly add any number of identifications of data blocks 130 to the queue as the data generation service 120 finishes storing data in data blocks 130 and transmits messages identifying the data blocks 130 to the data analysis service 124. In some embodiments, the data generation service 120 adds the identification to the queue. The data generation service 120 can transmit a message to the data analysis service 124 indicating the identification has been added to the queue or the data analysis service 124 can detect the addition of the identification in the queue. Upon finishing processing the data in a data block 130, the data analysis service 124 may identify the identification of the data block 130 from the queue and begin processing data in the identified data block 130 from the queue. The data analysis service 124 may finish processing data in the data block 130 and then identify and begin processing data in the next identified data block 130 from the queue. Accordingly, the data analysis service 124 may maintain a sequential order of processing data, which may enable the data analysis service 124 to more accurately generate KPIs and/or alerts from timeseries data and/or other data associated with timestamps.

In one example, the data generation service 120 may store data in the data block 130*a* during a first time window. Upon completion of the first time window, the data generation service 120 may transmit a message to the data analysis service 124 identifying the data block 130*a*. The data analysis service 124 may receive the message and add the identification of the data block 130*a* to a queue the data analysis service 124 stores in the memory 116. The data analysis service 124 may similarly add any number of identifications of data blocks 130 to the queue. Upon completing processing of another data block 130 or upon determining the data analysis service 124 is not currently processing data of any data block 130, the data analysis service 124 may identify the identification of the data block 130*a* from the queue as the next data block in the queue and begin processing data in the data block 130*a*. While processing data in the data block 130*a*, the data generation service 120 may store data in the data block 130*b* during a second time window. At the end of the second time window, the data generation service 120 may transmit a message identifying the data block 130*b* to the data analysis service 124. The data analysis service 124 may receive the message and add the identification of the data block 130*b* to the queue. The data analysis service 124 may finish processing data in the data block 130*a*, remove the data from the data block 130*a*, identify the identification of the data block 130*b* responsive to the identification of the data block 130*b* being the next data block 130 in the queue, and process data in the data block 130*b* responsive to identifying the identification of the data block 130*b*. In some embodiments, the data analysis service 124 may transmit a message to the data generation service 120 identifying the data block 130*a* upon completing processing data in the data block 130*a*. Accordingly, the data generation service 120 may later insert data into the data block 130*a*. In this way, the data generation service 120 may operate to store and process data in different data blocks without copying or sharing data between each other, reducing the processing power that is required for such processing.

The data analysis service 124 can process data in multiple data blocks at a time or in parallel. The data generation service can do so using multiple cores or threads. For example, while processing a first data block in one thread or core, the data analysis service 124 can process data in a second data block in a second thread or core. The data analysis service 124 can have any number of threads or cores to process data in data blocks. In another example, while processing data from a first data block in one thread, the data analysis service 124 can receive the second identification of a second data block from the data generation service 120. The data analysis service 124 can identify the second identification of the second data block from the queue, in some cases in response to receiving the message from the data generation service 120, and begin processing data from a second data block in another thread.

In some embodiments, the data generation service can use multiple threads to process data from the same data block. The multiple threads may do so concurrently or at the same time. Such processing can increase the speed of processing data of individual data blocks, increasing the scalability of the systems and methods described herein. In one example, different threads may correspond to processing data in different ways. For instance, different threads may be configured to generate different KPIs. The different threads can process data from individual data blocks at the same time in parallel, increasing the speed of processing compared to only using one thread to generate each KPI from a single data block.

The data generation service 120 and/or the data analysis service 124 may maintain a queue (e.g., a data storage queue) for storing data in data blocks. For example, after the data analysis service 124 finishes processing data of a data block 130, the data analysis service 124 may transmit a message to the data generation service 120 identifying the data block 130. The data generation service 120 may identify the data block and add an identification of the data block 130 to the queue. The data analysis service 124 and transmit such messages to the data generation service 120 for each data block 130 the data analysis service 124 finishes processing. The data generation service 120 may add the identifications of the data blocks 130 to the queue for each message and identify the data block 130 in which to store data as the earliest (e.g., the first) identification in the queue. The data generation service 120 may store data in a data block 130 based on identifying an identification of the data block 130 from the queue, finish storing data in the data block 130, identify the next identification of a data block 130 from the queue, and begin storing data in the identified next data block 130. The data generation service 120 may store identifications of any number of data blocks in the queue and repeat this process any number of times.

The data analysis service 124 may generate intermediate results by processing data in the data blocks 130. The intermediate results may be data or values that the data analysis service 124 retrieves from a data block 130 or generates by performing a function (e.g., an averaging or a summation function) on data retrieved from the data block 130. The data analysis service 124 may generate such intermediate results for each data block 130 and store the intermediate results in the memory 116.

When processing data from individual data blocks 130, the data analysis service 124 may apply rules (e.g., conditions or rules that include conditions) to data the data analysis service 124 retrieves from the respective data blocks 130. The data analysis service 124 may do so based on retrieved data from the individual data blocks 130. For example, the data analysis service 124 may retrieve data from a first data block 130 of the data blocks 130. The data analysis service 124 may process the retrieved data by applying rules stored in the rules database 126 (e.g., a relational database that stores rules that correspond to different KPIs and/or alerts). The data analysis service 124 may identify which rules are satisfied based on the retrieved data from the first data block 130 to generate KPIs and/or alerts from the data. In one example, the data analysis service 124 determines a rule or condition is satisfied based on a defined value or defined data attribute the data analysis service 124 retrieved from the first data block. The data analysis service 124 may then separately process data from a second data block 130 (e.g., responsive to identifying the second data block 130 from a queue). The data analysis service 124 may apply rules from the rules database 126 only to data from the second data block to generate KPIs and/or alerts for the second data block 130. The data analysis service 124 may continue to process data in individual data blocks 130 to generate KPIs and/or alerts in this way for any number of data blocks 130.

The data analysis service 124 may process data from individual data blocks 130 in combination with intermediate results. For example, the data analysis service 124 may generate intermediate results from data in a first data block 130 and store the intermediate results in memory. The data analysis service 124 may then retrieve the intermediate results from memory and process the intermediate results in combination with data in a second data block 130. The data analysis service 124 may do so by applying rules from the rules database 126 to a combination of the data in the second data block 130 and the intermediate results the data analysis service 124 generated from the first data block 130 to generate KPIs and/or alerts. The data analysis service 124 may process intermediate results generated from any number of data blocks 130 at any one point in time. In some embodiments, the data analysis service 124 may remove intermediate results from memory after a defined time period. Accordingly, the data analysis service 124 may generate KPIs and alerts across multiple time windows, in some cases for large time periods, without outsourcing data storage to external data storage facilities and while minimizing the data storage requirements that are required to do so.

In some embodiments, when processing data from a data block 130, the data analysis service 124 adjusts the data the data analysis service 124 retrieves from the data blocks 130. The data analysis service 124 may do so by executing one or more functions such as an averaging function, a machine learning model, a summation function, a median function, etc. The data analysis service 124 may adjust the data in this way and store the adjusted data in memory as an intermediate result, in some embodiments. The data analysis service 124 may similarly adjust any intermediate results upon retrieving the intermediate results from memory. The data analysis service 124 may apply rules to the adjusted data and/or intermediate results in combination with unadjusted data and/or intermediate results (if any) during processing to determine KPIs and/or alerts from the data.

In some embodiments, the data processing system determines a type of alert or KPI based on a condition (e.g., a condition of a rule) that is satisfied. For example, different conditions of the rules may correspond to different types of alerts (e.g., types of problems of a communications network) and/or KPIs (e.g., performance indicators of a communications network). The data processing system may identify a condition that is satisfied, identify a type of KPI or type of alert that corresponds to the satisfied condition. And generate an alert or KPI of the identified type that corresponds to the satisfied condition.

The exporter 128 may be or comprise executable instructions that, upon execution by the processor 114, may export generated KPIs or alerts and/or corresponding data to the computing device 102 (e.g., an external computer). For example, the exporter 134 may create an exportable record (e.g., a file, document, table, listing, message, notification, etc.) or file (e.g., a file with a format such as BIL, GRD/TAB, PNG, ASKII, KMZ, etc.) from the generated KPIs and/or alerts and transmit the exportable file to the computing device 102 for display. The exporter 134 may transmit the exportable file to the computing device 102, in some cases responsive to a request from the computing device 102. In some embodiments, the data analysis service 124 and/or the exporter 134 may generate and/or export KPIs and/or alerts to the computing device 102 at set intervals to provide the computing device 102 with real-time updates of the performance communication sessions between nodes.

In some embodiments, the exporter 134 may export KPIs or alerts that the data analysis service 124 generates based on the data in data packets. The exporter 134 may encapsulate the KPIs or alerts into data packets and transmit the data packets to the computing device 102 for processing (e.g., for display at a user interface). In some embodiments, the exporter 134 encapsulates and/or transmits the data the data collector 118 collects to the computing device 102 without generating KPIs or alerts from the data. In such embodiments, the computing device 102 may display the data and/or generate the KPIs itself.

Advantageously, implementing the systems and methods described herein to efficiently carry and query data to enable fully programmable, in-flight analytics with multiple resolutions at enterprise scale without making it mandatory to store all the data at an external data lake.

Figure 2A:
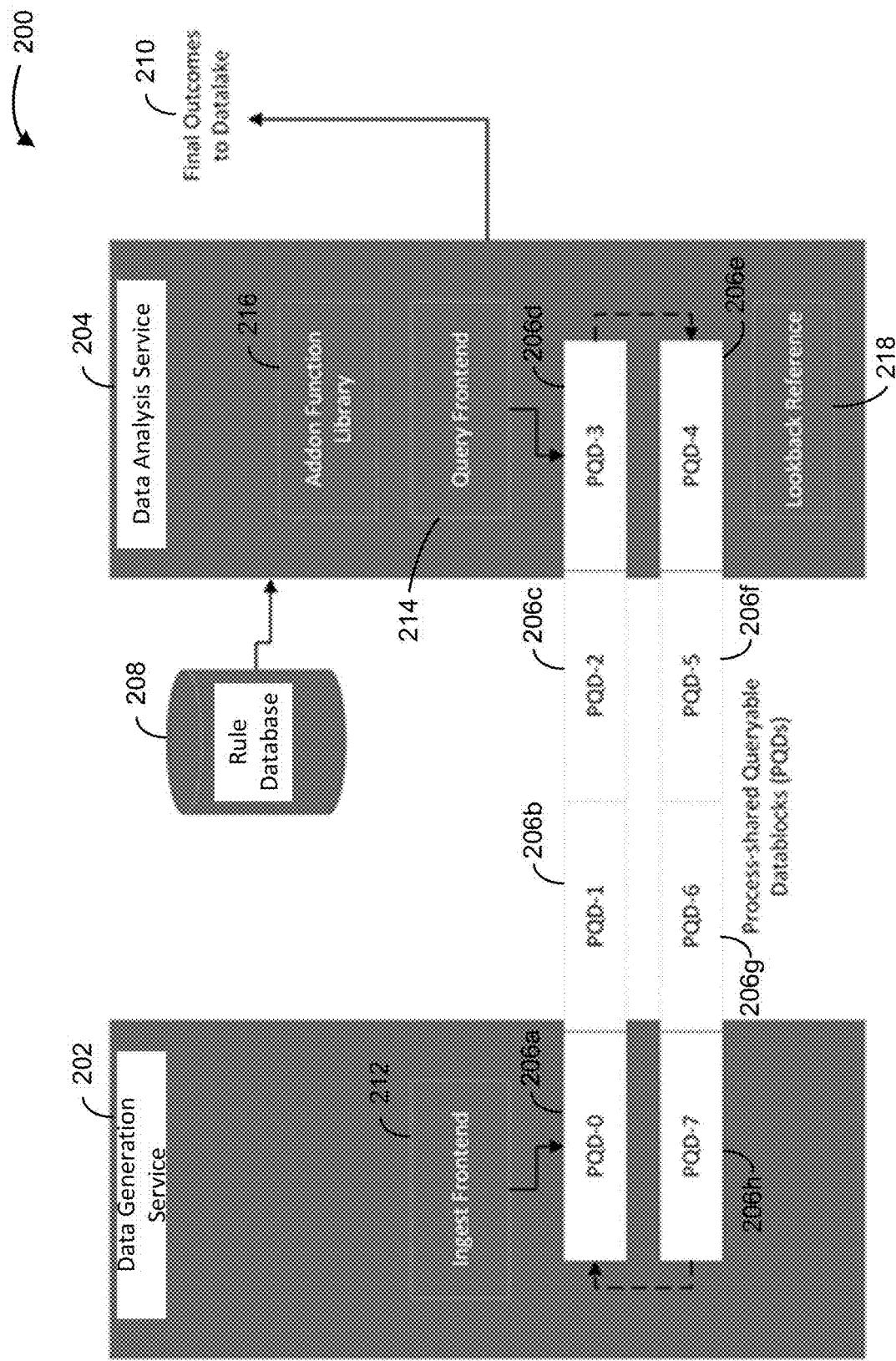
FIGS. 2A-2B illustrate a sequence of operating an analytics system, in accordance with an implementation.
Figure 2B:
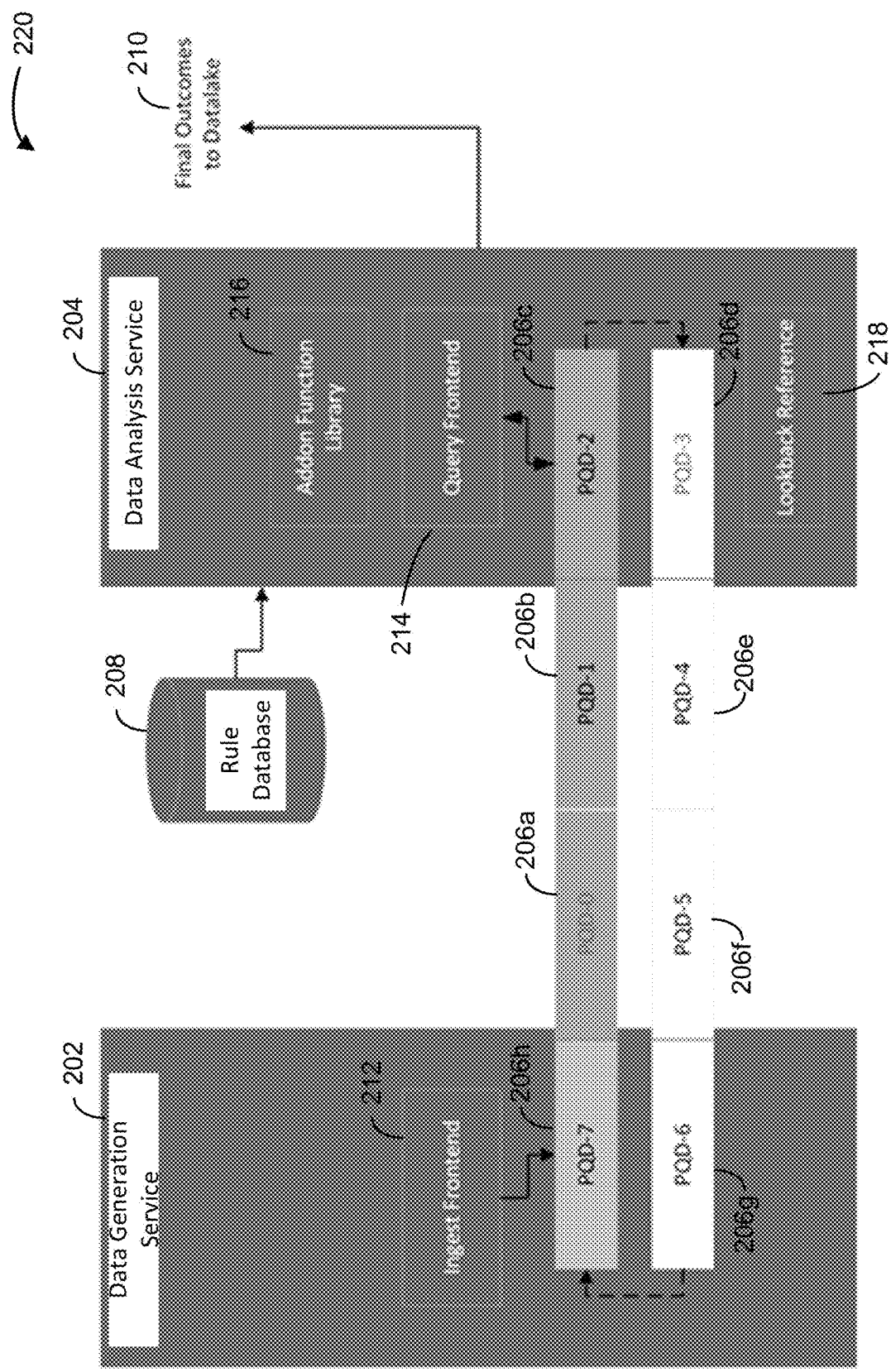

FIGS. 2A-2B illustrate a sequence including operations 200 and 220 for analyzing data using data blocks, in accordance with an implementation. The sequence can be performed by a data processing system (a client device, a probe, the analytics platform 110, shown and described with reference to FIG. 1, a server system, etc.). The sequence may include more or fewer operations and the operations may be performed in any order.

The data processing system may have similar components to the analytics platform 110, shown and described with reference to FIG. 1. For example, the data processing system may execute a data generation service 202 and a data analysis service 204 to process real-time today to generate KPIs and/or alerts. The data generation service 202 may be the same as or similar to the data generation service 120. The data analysis service 204 can be the same as the data analysis service 124. The data generate service 202 can store data in data blocks 206a-e (hereinafter data block 206 or data blocks 206). The data blocks 206 can be the same or similar to the data blocks 130. The data analysis service 204 may retrieve data from the data blocks 206 and rules from a rules database 208, which can be the same as or similar to the rules database 126. The data analysis service 204 may apply the retrieved rules to the retrieved data to generate alerts and/or KPIs. The data analysis service 204 may transmit the generated alerts and/or KPIs to a data lake 210 (e.g., the computing device 102, shown and described with reference to FIG. 1).

The data generation service 202 and the data analysis service 204 may include one or more sub-modules of code. For example, the data generation service 202 may include an ingest frontend 212. The ingest frontend 212 may include executable code that, upon execution, ingests data from various data sources (e.g., network monitoring equipment, network capturing equipment, Domain Name System servers, email servers, etc.) and stores the ingested data in various data blocks 206. The ingest frontend 212 may store or insert the data into the data blocks 206 in a queryable format such that the data analysis service 204 may query the data blocks 206 for processing without creating a new copy of the data. The ingest frontend 212 may be responsible for time windowing ingested data to split the data into multiple data blocks 206 based on the time windows in which the data was ingested.

The data analysis service 204 may include a query frontend 214. The query frontend 214 may include executable code that, upon execution, queries the data blocks 206 per defined rules (e.g., rules in the rules database 208). The query frontend 214 and the ingest frontend 212 may share a common schema such that the query frontend 214 is configured to retrieve data in the same format as the format in which the ingest frontend 212 inserts the data into the data blocks 206.

The data analysis service 204 may include an add-on function library 216. The add-on function library 216 may include executable code that, upon execution, performs one or more algorithms or functions on data that the query frontend 214 retrieves from the data blocks 206.

The data analysis service 204 may include a lookback reference 218. The lookback reference 218 may be a location in memory at which the query frontend 214 stores intermediate results that the query frontend retrieves from the data blocks 206 and/or derives using one or more functions or rules from the rules database 208. The query frontend 214 may later retrieve the intermediate results from the lookback reference 218 for processing to generate KPIs and/or alerts based on the intermediate results, in some cases in combination with data from a data block 206.

In the sequence, at operation 200 and during a first time interval, the ingest frontend 212 may store data in the data block 206a. While doing so, the data analysis process (e.g., the query frontend 214 and/or the add-on function library 216) may run analytics on the data block 206d. The data blocks 206b and 206c may be in the queue for processing subsequent to the data block 206d.

At operation 220 and during a second time interval subsequent to the first time interval, the ingest frontend 212 may store data in the data block 206h. While doing so, the data analysis service 204 may run analytics on the data block 206c. The data blocks 206a and 206b may be in the queue for processing subsequent to the data block 206c. In some embodiments, upon finishing processing the data block 206c, the data analysis service 204 can remove data from the data block 206c and put the data block 206 in the queue for reuse by the data generation service 202 (e.g., by transmitting an identification of the data block 206c to the data generation service 202). By using the multiple queues, the data generation service 202 and the data analysis service 204 may operate asynchronously (e.g., the data generation service 202 can add data to the data blocks 206 at the data generation service 202's own speed and the data analysis service 204 may add data to the data blocks 206 at the data analysis service 204's own speed).

Figure 2C:
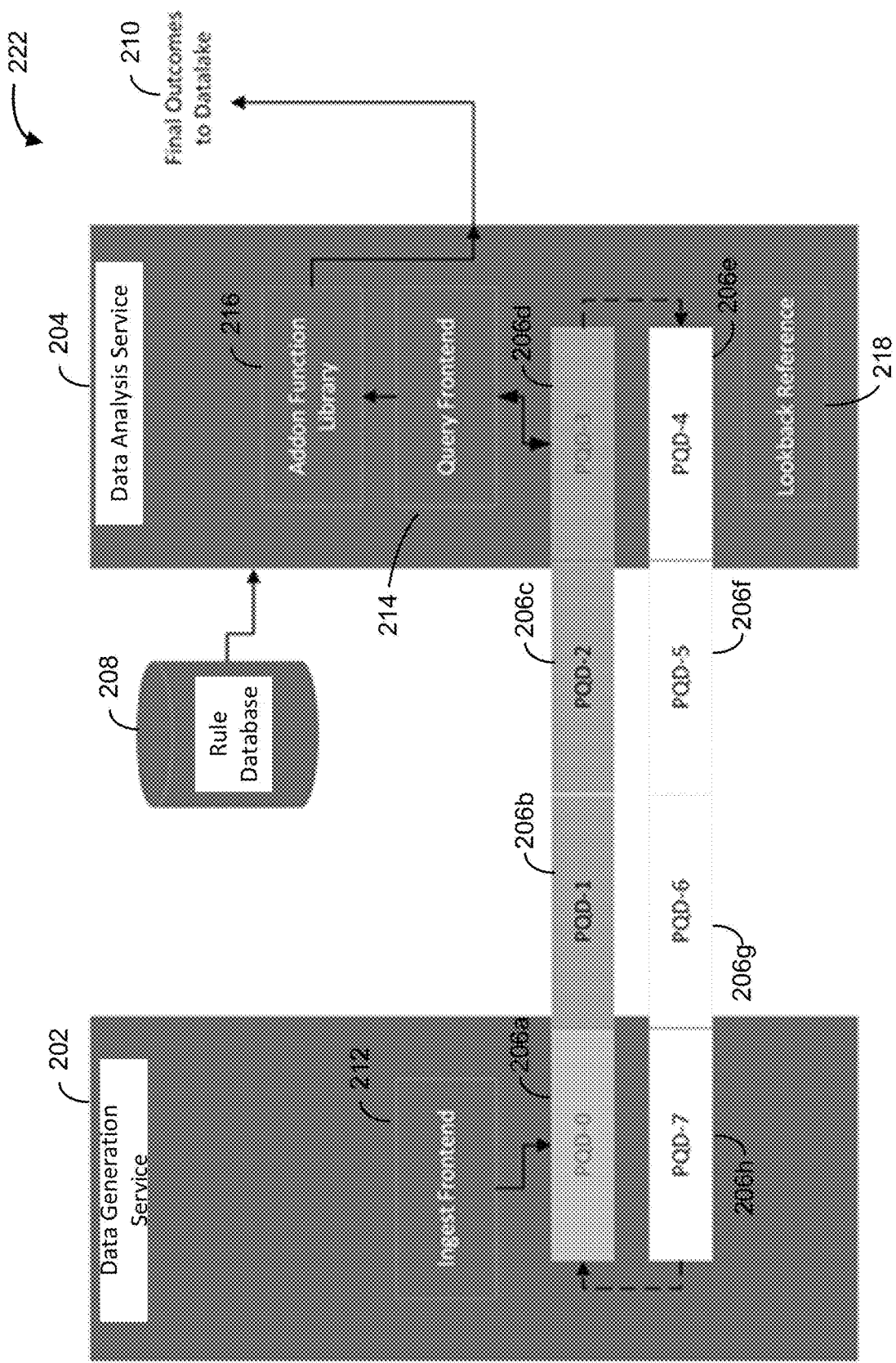
FIGS. 2C-2D illustrate scenarios of operating an analytics system, in accordance with an implementation.
Figure 2D:
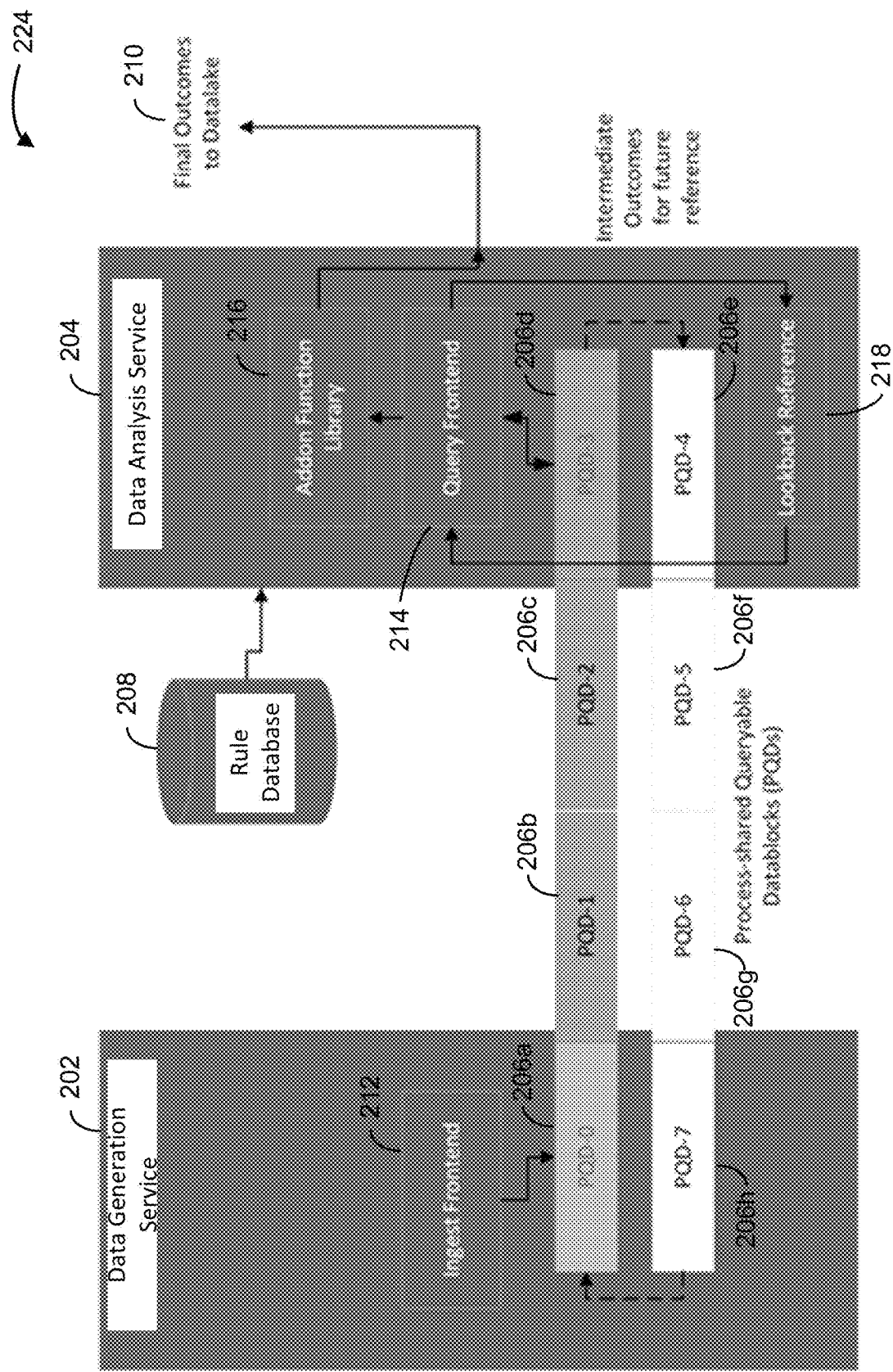

FIGS. 2C-2D illustrate scenarios 222 and 224 for analyzing data using data blocks, in accordance with an implementation. The scenarios 222 and 224 may involve a data processing system as described above with respect to FIGS. 2A-2B.

The scenario 222 may be a scenario illustrating processing of a data block 206. In the scenario 222, the query frontend 214 may pass query results from a data block 206 to the add-on function library 216. The add-on function library may adjust the query results according to one or more functions to generate alerts and/or KPIs to transmit to the data lake 210. Operating in this manner may not require any visibility into past data blocks 206. The scenario 222 can be performed for multiple analytical use cases at a resolution of a single record (e.g., a file, document, table, listing, message, notification, etc.) or an aggregation of multiple records of a single data block 206.

The scenario 224 may be a scenario illustrating processing of a data block 206 based on previous processing of one or more data blocks 206. In the scenario 224, the query frontend 214 may retrieve query results from the data block 206d and intermediate results from the lookback reference 218. The data analysis service 204 may apply rules to the retrieved data and/or intermediate results to generate KPIs and/or alerts, in some cases after applying functions from the add-on function library 216 to a portion or all of the retrieved data and/or intermediate results. In this way, the data analysis service 204 may process data across multiple data blocks 206.

FIG. 3A is an illustration of a method 300 for analyzing data in real time, in accordance with an implementation. The method 300 can be performed by a data processing system (e.g., a client device, a probe, the analytics platform 110, shown and described with reference to FIG. 1, a server system, etc.). The method 300 may include more or fewer operations and the operations may be performed in any order. Performance of the method 300 may enable the data processing system to analyze real-time data over different time windows and for multiple time windows without transmitting data to an external data source and while minimizing the data storage requirements to do so.

At operation 302, the data processing system initializes a programmable (e.g., adjustable or dynamic) number of data blocks in memory. The programmable number of data blocks can include any number of data blocks, including at least a first data block and a second data block. The number of data blocks can be programmable because a user can input (e.g., by accessing the data processing system through a client device) a number of data blocks to use. The number of data blocks can dynamically change over time as the user or different users provide inputs to change the number of data blocks to use to store and process data. In some embodiments, data blocks can be downloaded into memory of the data processing system (e.g., more of the memory of the data processing system can be allocated to be one or more data blocks or external disk or hard drive can be connected with the data processing system to provide further memory for data block allocation). Adding further data blocks can improve the data storage and processing capabilities of the data processing system. The data processing system may store the first data block and the second data block in random access memory or in on-disk storage. The data processing system may additionally store a data generation service and a data analysis service in memory, each a set of executable code configured to operate upon execution by the data processing system.

At operation 304, the data processing system receives a first set of data. The data processing system may receive the first set of data during a first time window (e.g., a defined time window). The data may be data the data processing system receives from a probe monitoring a 5G network, emails from an email server, Domain Name System logs from a Domain Name System server, or any other type of data.

At operation 306, the data processing system stores the first set of data in the first data block. The data processing system may store the first set of data in the first data block during the first time window. The data processing system may store the first set of data in the first data block via the data generation service. In doing so, the data processing system may store the first set of data in a queryable format such that the data may be retrieved without copying or transforming the data.

At operation 308, the data processing system determines whether the first time window is over. The data processing system may maintain a counter or a clock. The data processing system may increment the counter at set intervals until the count reaches a defined value or store a defined time corresponding to the end of the first time window in memory. The data processing system may monitor the counter or the clock over time to determine whether the count of the counter is equal to the defined value or whether the clock is equal to the defined time. The data processing system may do so while receiving and storing data in the first data block. The data processing system may continuously repeat operations 304-308 until determining the count of the counter is equal to the defined value or the clock is equal to the defined time to detect the end of the first time window.

Responsive to determining the second time window is over, at operation 310, the data processing system adds an identification of the first data block to a queue (e.g., a full queue). For example, the data generation service may transmit a message to the data analysis service identifying the first data block. The data analysis service may receive the message and add the identification of the first data block to a full queue (e.g., a list of data blocks for processing that have been filled with data, such as by the data generation service).

At operation 312, the data processing system identifies the first data block from the full queue. The data analysis service may identify the first data block from the full queue by identifying the identification of the first data block in the full queue as the first or next data block in the full queue.

At operation 314, the data processing system processes data from the first data block. The data processing system may process the data in the first data block during a second time window subsequent to the first time window. The data processing system may process the data in the first data block via the data analysis service. The data processing system may process the data by querying the first data block for defined values and/or data attributes. The data processing system may retrieve the data from the first data block without copying or transforming the data. The data processing system may apply rules and conditions to the defined values and/or data attributes. In some embodiments, the data processing system may apply a function to one or more of the retrieved values to adjust or change the values and apply one or more rules to the adjusted values. Responsive to determining a rule or condition is satisfied, the data processing system may generate one or more KPIs or alerts based on the data that satisfied the rule or condition and/or the satisfied rule or condition.

At operation 316, the data processing system adds an identification of the first data block to an empty queue. The empty queue can be a list of data blocks that do not contain data. The empty queue can be generated as the data analysis service processes data in data blocks and removes the data from the processed data blocks. The data analysis service can add the identification of the first block to the empty queue by transmitting a message containing the identification of the first data block to the data generation service. The data generation service can add the received identification of the first data block to the empty queue. At a later time, the data generation service can identify the identification of the first data block from the empty queue and store data in the empty queue that the data generation service receives in real-time.

In some embodiments, the data processing system may generate an intermediate result by processing the data in the first data block. The data processing system may generate the intermediate result as the queried or adjusted value or data attributes that the data processing system generates by processing data in the first data block. At operation 320, the data processing system may store the intermediate result in memory.

At operation 322, the data processing system receives a second set of data. The data processing system may receive the second set of data during the second time window (e.g., while the data processing system is processing data in the first data block). At operation 324, the data processing system stores the second set of data in a second data block. At operation 326, the data processing system determines whether the second time window is over. The data processing system may perform the operations 320-324 in a similar manner to how the data processing system performs the operations 304-308, but storing data in the second data block instead of the first data block and during the second time window instead of the first time window.

Responsive to determining the second time window is over, at operation 326, the data processing system adds an identification of the second data block to the full queue. For example, the data generation service may transmit a message to the data analysis service identifying the second data block. The data analysis service may receive the message and add the identification of the second data block to the full queue (e.g., a list of data blocks for processing).

At operation 328, the data processing system determines whether the data analysis service has finished processing the first data block. The data processing system may do so by analyzing the first data block to determine whether there are any more values or data attributes to query or process. Responsive to determining there are more values or data attributes to process, the data analysis service may continue processing the first data block (e.g., data in the first data block) and repeat the operation 328 at set time intervals.

Responsive to determining the data processing system has finished processing the first data block, at operation 330, the data processing system identifies the second data block from the full queue. The data analysis service may identify the second data block from the full queue by identifying the identification of the second data block in the full queue as the first or next data block in the queue.

Responsive to identifying the second data block from the full queue, at operation 332, the data processing system processes data in the second data block during a third time window subsequent to the first and second time windows. The data processing system may process the data in the second data block in a similar manner to how the data processing system processed data in the first data block. In some embodiments, the data processing system may process the data in the second data block by retrieving any intermediate results that the data processing system generated from the first data block and apply rules or conditions to the retrieved intermediate results in combination with the data in the second data block.

In some embodiments, the data processing system processes the data in the second data block and/or the retrieved intermediate results by applying a function (e.g., an averaging function or a median function) to the data in the second data block and/or the retrieved intermediate results. In some embodiments, the data processing system may process the data and/or the retrieved intermediate results by inserting the data and/or the intermediate results into a machine learning model (e.g., a support vector machine, a neural network, a clustering algorithm, etc.) and the machine learning model may output a new value. The data processing system may process the data in any manner.

At operation 334, the data processing system generates one or more multiple KPIs and/or alerts. The data processing system may generate such a KPI and/or alert based on the data, intermediate result, adjusted data, and/or adjusted intermediate result. The data processing system may generate the KPIs and/or the alerts based on a rule or condition that is satisfied by the data, intermediate result, adjusted data, and/or adjusted intermediate result. Upon generating the KPIs and/or the alerts, the data processing system may generate a record from the KPIs and/or alerts and transmit the record to a processor of a computing device. The data processing system can perform the operation 334 as a part of performing the operation 332, in some embodiments.

At operation 336, the data processing system adds an identification of the second data block to the empty queue. The data analysis service can add the identification of the second data block to the empty queue by transmitting a message containing the identification of the second data block to the data generation service. The data generation service can add the received identification of the second data block to the empty queue. At a later time, the data generation service can identify the identification of the second data block from the empty queue and store data in the empty queue that the data generation service receives in real-time.

Figure 3B:
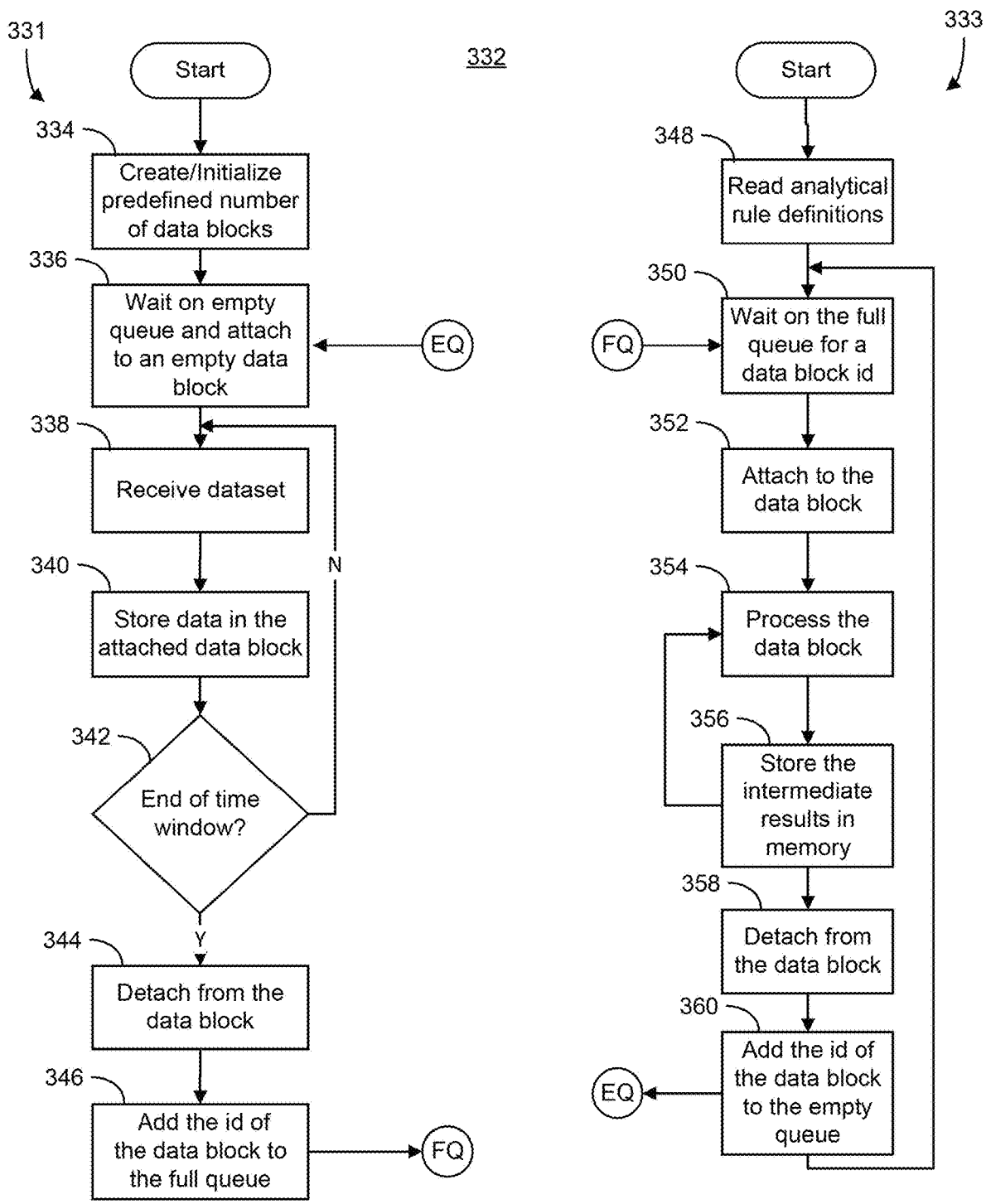
FIG. 3B is an illustration of a method for analyzing data in real time, in accordance with an implementation.

FIG. 3B is an illustration of a method 332 for analyzing data in real time, in accordance with an implementation. The method 332 can be performed by a data processing system (e.g., a client device, a probe, the analytics platform 110, shown and described with reference to FIG. 1, a server system, etc.). The method 332 may include more or fewer operations and the operations may be performed in any order. The method 332 can be the same method or be described in tandem or concurrently with the method 300. The method 332 can include a sequence 331 and a sequence 333. The sequence 331 can be performed by a first service (e.g., a first set of executable code, the data generation service 120, etc.) of the data processing system to store received data over time within data different data blocks for set time periods. The sequence 333 can be performed by a second service (e.g., a second set of executable code, the data analysis service 124, etc.) of the data processing system to analyze the data from the data blocks. The first service can perform operations of the sequence 331 in parallel or at the same time as the second service performs operations of the sequence 333. Performance of the method 332 may enable the data processing system to analyze real-time data over different time windows and for multiple time windows on the same device and without transmitting data to an external data source and while minimizing the data storage requirements to do so.

At operation 334, the data processing system creates or initializes a programmable number of data blocks. The data processing system can create or initialize the data blocks by allocating portions in memory for the data blocks in which data can be stored. At operation 336, the data processing system waits on an empty queue (e.g., a queue that holds the identifications of empty (e.g., already processed) data blocks) and attaches to an empty data block. The data processing system can do so by identifying a block instance from a queue of previously initialized data blocks. The first service of the data processing system can identify such a block instance by identifying an identification of the empty data block from a queue of empty data blocks (e.g., data blocks in which data has not been stored or data blocks that have previously been emptied of data).

At operation 338, the data processing system receives a data set. The data processing system can receive the data set from data capturing equipment, such as a probe monitoring a network (e.g., a 5G network) or an email server. At operation 340, the data processing system stores data from the received dataset in the attached data block (e.g., the selected or identified data block). The data processing system can continue to receive and store data in the attached data block until, at operation 342, the data processing system detects the end of a time period for the data block.

Responsive to detecting the end of the time period for the data block, at operation 344, the data processing system detaches from the data block. The data processing system can detach from the data block by stopping storing data in the data block. The data processing system can stop storing data in the data block and begin storing data in another data block (e.g., store data in another data block for another set time period) that the data processing system identifies from the wait queue (e.g., the queue of empty data blocks). At operation 346, the data processing system adds an identification of the detached data block to the full queue of data blocks (e.g., the queue of loaded data blocks (e.g., data blocks that have each been filled with data over a set time period) to be analyzed by the second service in the sequence 333). The first service can transmit a message containing an identification of the detached data block to the second service indicating the detached data block is full or available for processing.

At operation 348, the data processing system reads analytical rule definitions. The data processing system can read the analytical rule definitions from memory. The analytical rule definitions can be rules or conditions for querying and/or adjusting data in the data block stored during the operations 338-342. At operation 350, the data processing system waits on the full queue for an identification of a data block. The second service can wait on the full queue by waiting for a message from the first service and/or the second service can monitor the full queue for an identification of a data block to be added to the full queue. The second service can receive a message from the first service containing an identification of a data block in the full queue and/or detect an identification of a data block in the full queue. At operation 352, the data processing system attaches to the detected data block. The data processing system can attach to the data block by identifying the data block's location in memory.

At operation 354, the data processing system processes the attached data block. The data processing system can process the data block by querying the data block for data according to set rules and/or conditions. The data processing system can adjust and/or retrieve data from the data block to generate intermediate results. The data processing system can store the immediate results in memory. The data processing system can repeat operations 354 and 356 until processing all or a defined portion or percentage of the data in the data block.

At operation 356, the data processing system detaches from the data block. The second service can detach from the data block by transmitting a message to the first service indicating processing is complete of data in the data block. The second service can add an identification of the detached block to the wait queue.

The first service can identify the identification from the wait queue at the operation 336 and repeat the operations 336-346. The second service can repeat the operations 350-360 and the first service can repeat the operations 336-346 for any number of data blocks. The first service can perform the operations 336-346 (e.g., receive and store data in different data blocks for different time periods) while the second service performs the operations 350-360 (e.g., process the data in the data blocks).

In one example, a data generation process executed by a processor continuously generates data in real-time and stores the data into discrete data blocks (e.g., disk files, RAM units, etc.). A data analyzer process executed by the processor can perform analytical queries, which can model a logic (e.g., cybersecurity analytics), on the data in the data blocks. After the analyzer process completes analytical queries on a particular data block, the analyzer process can remove the data (e.g., all or a portion of the data) from the data block to create an empty data block. Empty data blocks can be returned back to the data generation process for reuse. The data blocks can be shared resources in memory between the data generation and the data analyzer processes. This avoids copying data between different locations in memory and enables near real-time analytics. Further, the data can be stored in a directly queryable format. Doing so can eliminate the need for transforming the data for the analytics purposes, which can also boost the near real-time processing. Though at any given time a given analytical query can run on a single data block, the analyzer process can preserve certain important records from that data block to be used while analyzing subsequent data blocks at a later time. All these features in this system can work together to enable in-flight, multi-resolution, near real-time and programmable analytics on live data.

In one example, during initialization, a processor can create N empty data blocks. N can be any number. Then, as the data sets arrive, a generation service executed by the processor can grab a free data block and start storing the data into the data block. Once the time window is over, the generation service can release that data block (filled) and send an identification of the released data block to an analyzer service executed by the processor for processing. At the same time, the generation service can grab another empty data block and start filling the empty data block with new data. The analyzer service can pick up the (filled) data block using the identification provided by the generation service and run analytical queries on the data block. When the analyzer service completes processing of the data block (e.g., of the data in the data block), the analyzer service can generate results and send the identification of the data block back to the generation service. The generation service can reuse the data block to store data for new data sets arriving in the future time windows. This cycle can continue for any number of data blocks and/or sets of data.

Figure 4A:
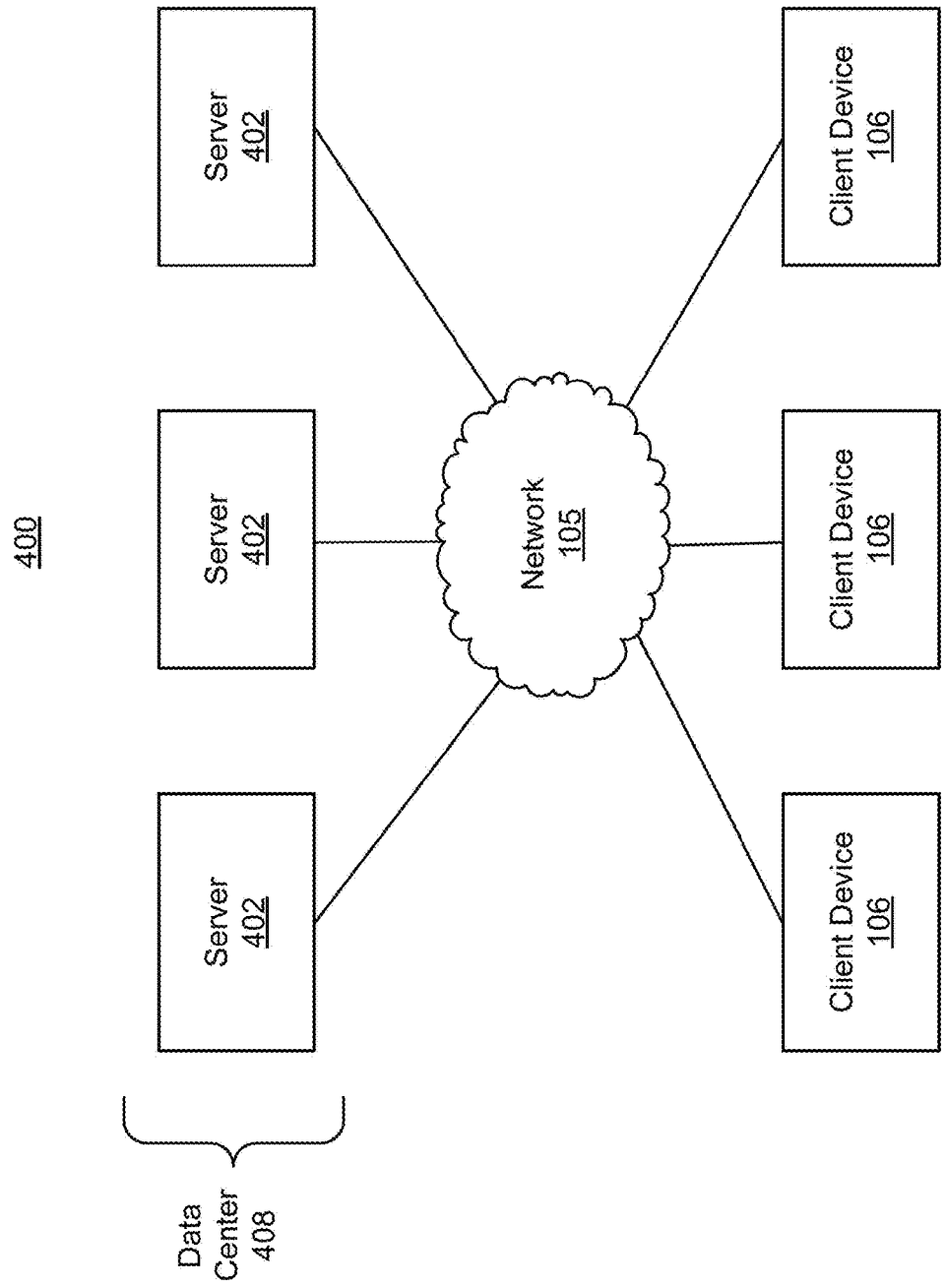
FIG. 4A is a block diagram depicting an implementation of a network environment including a client device in communication with a server device.

FIG. 4A depicts an example network environment that can be used in connection with the methods and systems described herein. In brief overview, the network environment 400 includes one or more client devices 106 (also generally referred to as clients, client node, client machines, client computers, client computing devices, endpoints, or endpoint nodes) in communication with one or more servers 402 (also generally referred to as servers, nodes, or remote machine) via one or more networks 105. In some embodiments, a client device 106 has the capacity to function as both a client node seeking access to resources provided by a server and as a server providing access to hosted resources for other client devices 106.

Although FIG. 4A shows a network 105 between the client devices 106 and the servers 402, the client devices 106 and the servers 402 can be on the same network 105. In embodiments, there are multiple networks 105 between the client devices 106 and the servers 402. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g. Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 400 can include multiple, logically grouped servers 402. The logical group of servers can be referred to as a data center 408 (or server farm or machine farm). In embodiments, the servers 402 can be geographically dispersed. The data center 408 can be administered as a single entity or different entities. The data center 408 can include multiple data centers 408 that can be geographically dispersed. The servers 402 within each data center 408 can be homogeneous or heterogeneous (e.g., one or more of the servers 402 or machines 402 can operate according to one type of operating system platform (e.g., WINDOWS NT, manufactured by Microsoft Corp. of Redmond, Washington), while one or more of the other servers 402 can operate on according to another type of operating system platform (e.g., Unix, Linux, or Mac OS X)). The servers 402 of each data center 408 do not need to be physically proximate to another server 402 in the same machine farm 408. Thus, the group of servers 402 logically grouped as a data center 408 can be interconnected using a network. Management of the data center 408 can be de-centralized. For example, one or more servers 402 can comprise components, subsystems and modules to support one or more management services for the data center 408.

Server 402 can be a file server, application server, web server, proxy server, appliance, network appliance, gateway, gateway server, virtualization server, deployment server, SSL VPN server, or firewall. In embodiments, the server 402 can be referred to as a remote machine or a node. Multiple nodes can be in the path between any two communicating servers.

Figure 4B:
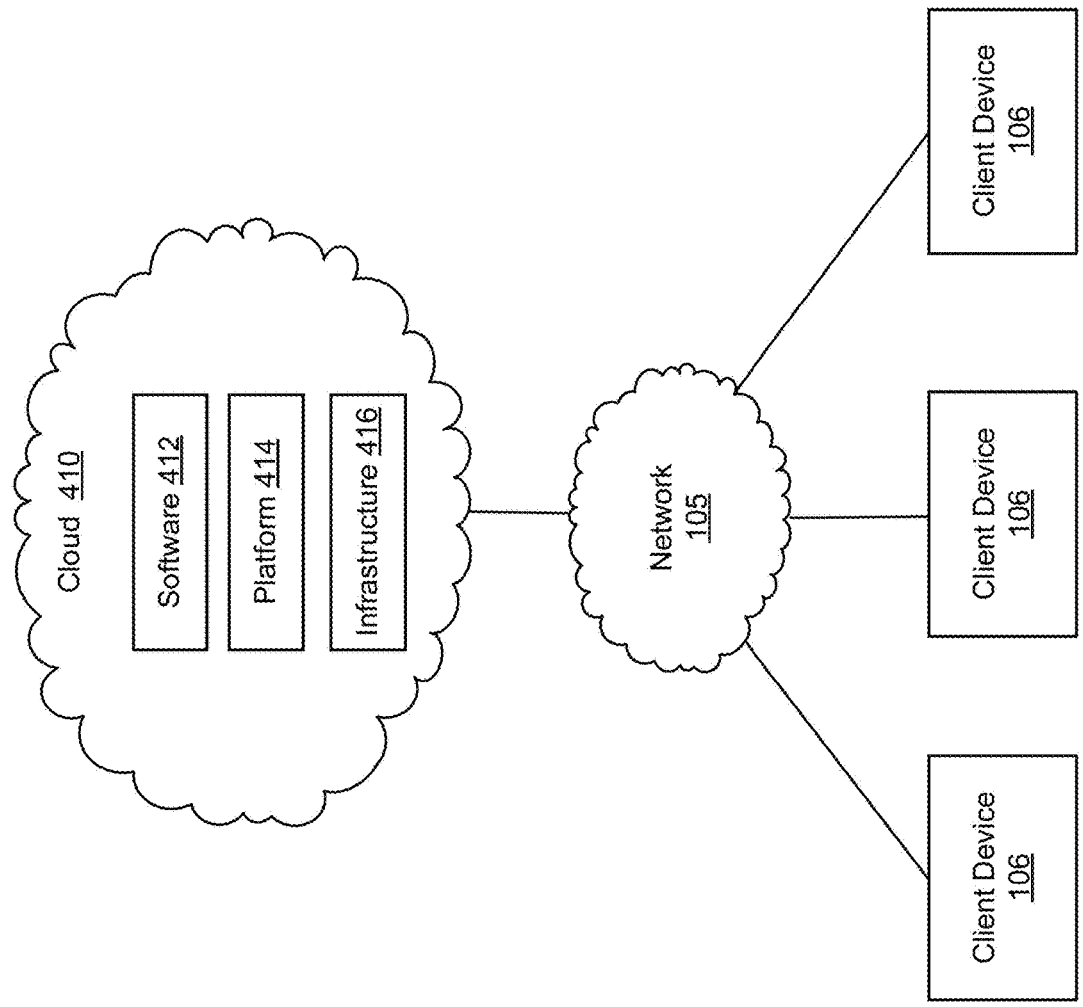
FIG. 4B is a block diagram depicting a cloud computing environment including a client device in communication with cloud service providers.

FIG. 4B illustrates an example cloud computing environment. A cloud computing environment 401 can provide the client device 106 with one or more resources provided by a network environment. The cloud computing environment 401 can include one or more client devices 106, in communication with the cloud 410 over one or more networks 105. Client devices 106 can include, e.g., thick clients, thin clients, and zero clients. A thick client can provide at least some functionality even when disconnected from the cloud 410 or servers 402. A thin client or a zero client can depend on the connection to the cloud 410 or server 402 to provide functionality. A zero client can depend on the cloud 410 or other networks 105 or servers 402 to retrieve operating system data for the client device. The cloud 410 can include back end platforms, e.g., servers 402, storage, and/or server farms or data centers.

The cloud 410 can be public, private, or hybrid. Public clouds can include public servers 402 that are maintained by third parties to the client devices 106 or the owners of the clients. The servers 402 can be located off-site in remote geographical locations as disclosed above or otherwise. Public clouds can be connected to the servers 402 over a public network. Private clouds can include private servers 402 that are physically maintained by client devices 106 or owners of clients. Private clouds can be connected to the servers 402 over a private network 105. Hybrid clouds 408 can include both the private and public networks 105 and servers 402.

The cloud 410 can also include a cloud-based delivery, e.g. Software as a Service (SaaS) 412, Platform as a Service (PaaS) 414, and the Infrastructure as a Service (IaaS) 416. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client device 106 and server 402 can be deployed as and/or executed on any type and form of computing device, e.g. a computer, network device or appliance capable of communicating on any type and form of network and performing the operations described herein.

Figure 4C:
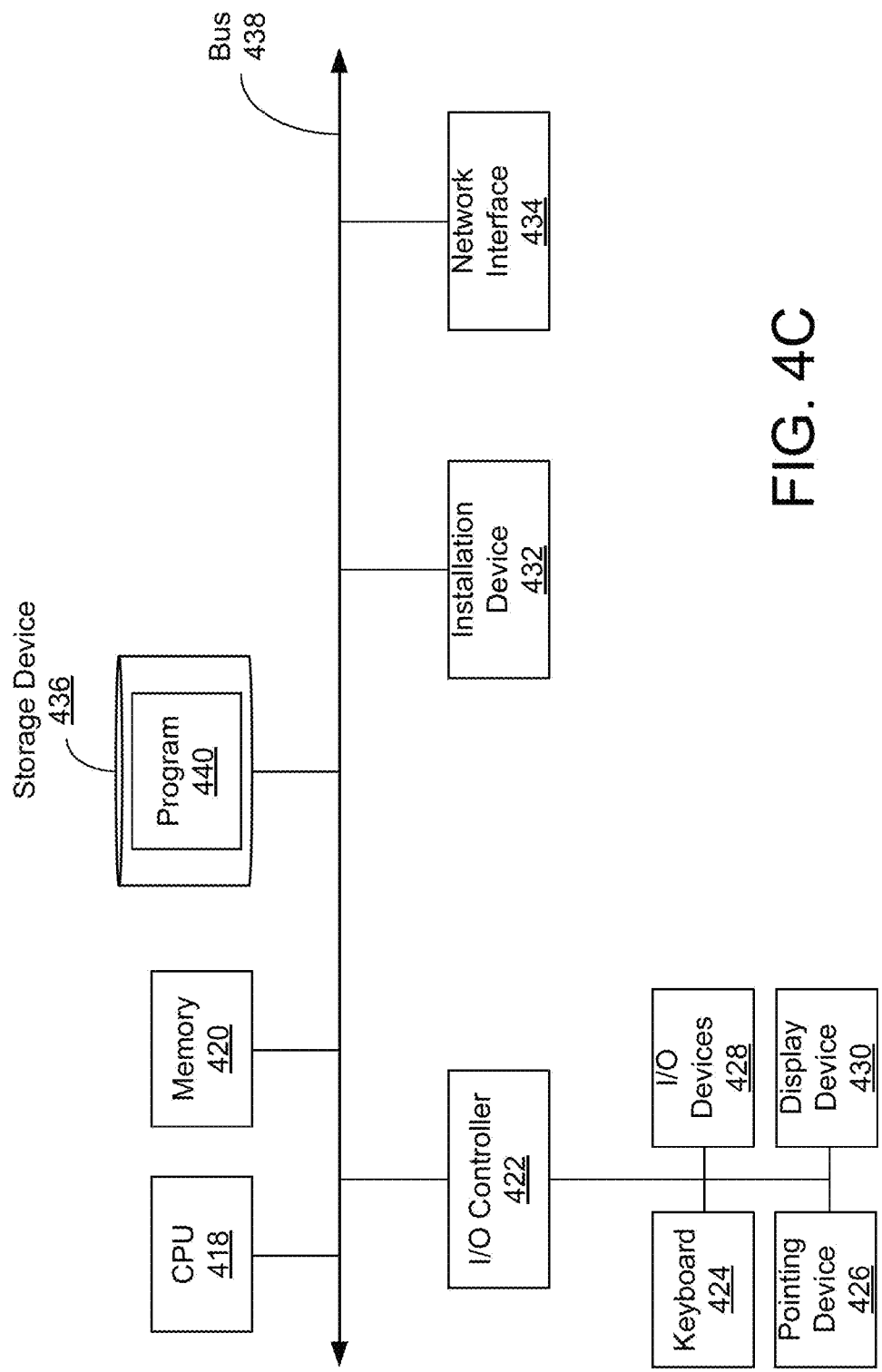
FIG. 4C is a block diagram depicting an implementation of a computing device that can be used in connection with the systems depicted in FIGS. 1, 4A, and 4B and the methods depicted in FIG. 3A and/or FIG. 3B.

FIG. 4C depicts block diagrams of a computing device 403 useful for practicing an embodiment of the client device 106 or a server 402. As shown in FIG. 4C, each computing device 403 can include a central processing unit 418, and a main memory unit 420. As shown in FIG. 4C, a computing device 403 can include one or more of a storage device 436, an installation device 432, a network interface 434, an I/O controller 422, a display device 430, a keyboard 424 or a pointing device 426, e.g. a mouse. The storage device 436 can include, without limitation, a program 440, such as an operating system, software, or software associated with system 100.

The central processing unit 418 is any logic circuitry that responds to and processes instructions fetched from the main memory unit 420. The central processing unit 418 can be provided by a microprocessor unit, e.g.: those manufactured by Intel Corporation of Mountain View, California. The computing device 403 can be based on any of these processors, or any other processor capable of operating as described herein. The central processing unit 418 can utilize instruction level parallelism, thread level parallelism, different levels of cache, and multi-core processors. A multi-core processor can include two or more processing units on a single computing component.

Main memory unit 420 can include one or more memory chips capable of storing data and allowing any storage location to be directly accessed by the microprocessor 418. Main memory unit 420 can be volatile and faster than storage 436 memory. Main memory units 420 can be Dynamic random access memory (DRAM) or any variants, including static random access memory (SRAM). The memory 420 or the storage 436 can be non-volatile; e.g., non-volatile read access memory (NVRAM). The memory 420 can be based on any type of memory chip, or any other available memory chips. In the example depicted in FIG. 4C, the processor 418 can communicate with memory 420 via a system bus 438.

A wide variety of I/O devices 428 can be present in the computing device 403. Input devices 428 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 428 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 428, display devices 430 or group of devices can be augmented reality devices. The I/O devices can be controlled by an I/O controller 422 as shown in FIG. 4C. The I/O controller 422 can control one or more I/O devices, such as, e.g., a keyboard 424 and a pointing device 426, e.g., a mouse or optical pen. Furthermore, an I/O device can also provide storage and/or an installation device 432 for the computing device 403. In embodiments, the computing device 403 can provide USB connections (not shown) to receive handheld USB storage devices. In embodiments, an I/O device 428 can be a bridge between the system bus 438 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 430 can be connected to I/O controller 422. Display devices can include, e.g., liquid crystal displays (LCD), electronic papers (e-ink) displays, flexile displays, light emitting diode displays (LED), or other types of displays. In some embodiments, display devices 430 or the corresponding I/O controllers 422 can be controlled through or have hardware support for OPENGL or DIRECTX API or other graphics libraries. Any of the I/O devices 428 and/or the I/O controller 422 can include any type and/or form of suitable hardware, software, or combination of hardware and software to support, enable or provide for the connection and use of one or more display devices 430 by the computing device 403. For example, the computing device 403 can include any type and/or form of video adapter, video card, driver, and/or library to interface, communicate, connect or otherwise use the display devices 430. In embodiments, a video adapter can include multiple connectors to interface to multiple display devices 430.

The computing device 403 can include a storage device 436 (e.g., one or more hard disk drives or redundant arrays of independent disks) for storing an operating system or other related software, and for storing application software programs 440 such as any program related to the systems, methods, components, modules, elements, or functions depicted in FIG. 1, 2, or 3. Examples of storage device 436 include, e.g., hard disk drive (HDD); optical drive including CD drive, DVD drive, or BLU-RAY drive; solid-state drive (SSD); USB flash drive; or any other device suitable for storing data. Storage devices 436 can include multiple volatile and non-volatile memories, including, e.g., solid state hybrid drives that combine hard disks with solid state cache. Storage devices 436 can be non-volatile, mutable, or read-only. Storage devices 436 can be internal and connect to the computing device 403 via a bus 438. Storage device 436 can be external and connect to the computing device 403 via an I/O device 430 that provides an external bus. Storage device 436 can connect to the computing device 403 via the network interface 434 over a network 105. Some client devices 106 may not require a non-volatile storage device 436 and can be thin clients or zero client devices 106. Some storage devices 436 can be used as an installation device 432 and can be suitable for installing software and programs.

The computing device 403 can include a network interface 434 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 403 can communicate with other computing devices 403 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 434 can include a built-in network adapter, network interface card, PCMCIA network card, EXPRESSCARD network card, card bus network adapter, wireless network adapter, USB network adapter, modem or any other device suitable for interfacing the computing device 403 to any type of network capable of communication and performing the operations described herein.

A computing device 403 of the sort depicted in FIG. 4C can operate under the control of an operating system, which controls scheduling of tasks and access to system resources. The computing device 403 can be running any operating system configured for any type of computing device, including, for example, a desktop operating system, a mobile device operating system, a tablet operating system, or a smartphone operating system.

The computing device 403 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 403 has sufficient processor power and memory capacity to perform the operations described herein. In some embodiments, the computing device 403 can have different processors, operating systems, and input devices consistent with the device.

In embodiments, the status of one or more machines 106, 402 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 403 in response to the CPU 418 executing an arrangement of instructions contained in main memory 420. Such instructions can be read into main memory 420 from another computer-readable medium, such as the storage device 436. Execution of the arrangement of instructions contained in main memory 420 causes the computing device 403 to perform the illustrative processes described herein. One or more processors in a multi-processing arrangement may also be employed to execute the instructions contained in main memory 420. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

At least one aspect of this technical solution is directed to a method. The method may include initializing, by a processor, a programmable number of data blocks in a location in memory each accessible to a data generation service and a data analysis service, the programmable number of data blocks including at least a first data block and a second data block; receiving, by the processor during a first time window, a first set of data from network capturing equipment connected to a communications network; storing, via the data generation service by the processor during the first time window, the first set of data in the first data block as the processor receives the first set of data from the network capturing equipment; processing, via the data analysis service by the processor during a second time window subsequent to the first time window, the first set of data from the first data block to generate one or more alerts or a key performance indicators (KPIs); and while processing the first set of data via the data analysis service: receiving, by the processor during the second time window, a second set of data from the network capturing equipment; and storing, via the data generation service by the processor during the second time window, the second set of data in the second data block as the processor receives the second set of data from the communications network.

At least one aspect of this technical solution is directed to a system. The system may include one or more processors, coupled to memory. The one or more processors may initialize a programmable number of data blocks in a location in memory each accessible to a data generation service and a data analysis service, the programmable number of data blocks including at least a first data block and a second data block; receive, during a first time window, a first set of data from network capturing equipment connected to a communications network; store, via the data generation service during the first time window, the first set of data in the first data block as the one or more processors receive the first set of data from the network capturing equipment; process, via the data analysis service during a second time window subsequent to the first time window, the first set of data from the first data block to generate one or more alerts or a key performance indicators (KPI); and while processing the first set of data via the data analysis service: receive, during the second time window, a second set of data from the network capturing equipment; and store, via the data generation service during the second time window, the second set of data in the second data block as the processor receives the second set of data from the communications network.

At least one aspect of this technical solution is directed to a method. The method may include initializing, by a processor, a programmable number of data blocks in a location in memory each accessible to a data generation service and a data analysis service, the programmable number of data blocks including at least a first data block and a second data block; receiving, by the processor during a first time window, a first set of data; storing, via the data generation service by the processor during the first time window, the first set of data in the first data block as the processor receives the first set of data; processing, via the data analysis service by the processor during a second time window subsequent to the first time window, the first set of data from the first data block to generate one or more alerts or key performance indicators (KPIs); and while processing the first set of data via the data analysis service: receiving, by the processor during the second time window, a second set of data; and storing, via the data generation service by the processor during the second time window, the second set of data in the second data block as the processor receives the second set of data.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the probe 104 or the analytics platform 110) to perform actions by operating on input data and generating an output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:
   initializing, by a processor, a programmable number of data blocks in a location in memory each accessible to a data generation service and a data analysis service, the programmable number of data blocks including at least a first data block and a second data block;
   receiving, by the processor during a first time window, a first set of data from network capturing equipment connected to a communications network;
   storing, via the data generation service by the processor during the first time window, the first set of data in the first data block as the processor receives the first set of data from the network capturing equipment;
   processing, via the data analysis service by the processor during a second time window subsequent to the first time window, the first set of data from the first data block to generate one or more alerts or key performance indicators (KPI); and
   while processing the first set of data via the data analysis service:
      receiving, by the processor during the second time window, a second set of data from the network capturing equipment; and
      storing, via the data generation service by the processor during the second time window, the second set of data in the second data block as the processor receives the second set of data from the communications network.

2. The method of claim 1, wherein processing the first set of data in the first data block comprises:
querying, via the data analysis service by the processor, the first data block without transforming or converting any data in the first data block from a format in which the data was stored by the data generation service in the first data block.

3. The method of claim 1, wherein storing the first set of data in the first data block comprises:
storing, via the data generation service by the processor, the first set of data in on-disk storage or in a file in random access memory.

4. The method of claim 1, further comprising:
subsequent to processing the first set of data, removing, via the data analysis service by the processor, at least a portion of the first set of data from the first data block and making the first data block available for reuse by the generation process during a third time window subsequent to the second time window.

5. The method of claim 4, comprising:
responsive to removing the at least a portion of the first set of data from the first data block, transmitting, via the data analysis service by the processor, an identification of the first data block to the data generation service;
receiving, by the processor, a third set of data from the network capturing equipment during a third time window subsequent to the second time window;
identifying, via the data generation service by the processor, the first data block based on the identification of the first data block; and
storing, via the data generation service by the processor and based on the identification of the first data block, the third set of data in the first data block as the processor receives the third set of data during the third time window.

6. The method of claim 1, wherein the first data block corresponds to a first identification, the method comprising:
responsive to identifying an end of the first time window, transmitting, by the data generation service, the first identification of the first data block to the data analysis service,
wherein processing the first set of data from the first data block comprises processing, by the data analysis service, the first set of data from the first data block responsive to receiving the first identification of the first data block.

7. The method of claim 6, further comprising:
processing, via the data analysis service by the processor, data from a third data block,
wherein processing the first set of data from the first data block comprises:
determining, via the data analysis service by the processor, the data analysis service has completed processing of data from the third data block; and
determining, via the data analysis service by the processor, to process data from the first data block based on the first identification of the first data block responsive to the determining the data analysis service has completed processing of the data in the third data block.

8. The method of claim 1, wherein processing the first set of data from the first data block comprises:
querying, via the data analysis service by the processor, the first data block according to a defined set of statistical operations, logical operations, mathematical operations, pattern matching operations, values, or data attributes f,
wherein generating the KPI or the alert comprises generating, via the data analysis service by the processor, the KPI or the alert in response to determining the first set of data satisfies the querying.

9. The method of claim 1, wherein processing the first set of data in the first data block comprises:
querying, via the data analysis service by the processor, the first data block for a defined value;
adjusting, via the data analysis service by the processor, the defined value according to a function stored in memory; and
determining, via the data analysis service by the processor, the adjusted defined value satisfies a condition,
wherein generating the KPI or the alert comprises generating, via the data analysis service by the processor, the KPI or the alert in response to determining the defined value satisfies the condition.

10. The method of claim 9, further comprising:
identifying, via the data analysis service by the processor, a type of alert based on the satisfied condition,
wherein generating the KPI or the alert comprises generating, via the data analysis service by the processor, an alert of the type of alert.

11. The method of claim 1, further comprising:
transmitting, by the processor, a record comprising the KPI or the alert to an external computer.

12. The method of claim 1, wherein the first data block corresponds to a first identification and the second data block corresponds to a second identification, the method comprising:
adding, via the data generation service by the processor, the second identification to a queue;
receiving, via the data analysis service by the processor, the second identification of the second data block from the data generation service;
determining, via the data analysis service by the processor, the data analysis service has completed processing of data in the first data block;
responsive to determining the data analysis service has completed processing the data in the first data block, identifying the second identification from the queue; and
processing, by the processor, the second set of data in the second data block based on the identifying the second identification from the queue.

13. The method of claim 1, wherein the first data block corresponds to a first identification and the second data block corresponds to a second identification, the method comprising:
adding, via the data generation service by the processor, the second identification to a queue;
receiving, via the data analysis service by the processor, the second identification of the second data block from the data generation service;
processing, by the processor and while processing the first set of data in the first data block, the second set of data in the second data block based on the identifying the second identification from the queue.

14. The method of claim 1, wherein processing the first set of data from the first data block comprises:
generating, via the data analysis service by the processor, an intermediate result based on querying the first set of data; and
storing, via the data analysis service by the processor, the intermediate result in memory.

15. The method of claim 14, comprising:
responsive to completing processing of the first set of data of the first data block, processing, via the data analysis service by the processor, the second set of data in the second data block, or a set of data collected and stored in a data block subsequent to the second set of data, in combination with the intermediate result.

16. The method of claim 15, wherein the processing the second set of data in the second data block in combination with the intermediate result comprises:
determining, via the data analysis service by the processor, an alert or KPI based on the intermediate result and at least a portion of the second set of data.

17. A system, comprising:
one or more processors, coupled to memory, to:
initialize a programmable number of data blocks in a location in memory each accessible to a data generation service and a data analysis service, the programmable number of data blocks including at least a first data block and a second data block;
receive, during a first time window, a first set of data from network capturing equipment connected to a communications network;
store, via the data generation service during the first time window, the first set of data in the first data block as the one or more processors receive the first set of data from the network capturing equipment;
process, via the data analysis service during a second time window subsequent to the first time window, the first set of data from the first data block to generate one or more alerts or key performance indicators (KPIs); and
while processing the first set of data via the data analysis service:
receive, during the second time window, a second set of data from the network capturing equipment; and
store, via the data generation service during the second time window, the second set of data in the second data block as the processor receives the second set of data from the communications network.

18. The system of claim 17, wherein the one or more processors process the first set of data in the first data block by:
querying, via the data analysis service, the first data block without transforming or converting any data in the first data block from a format in which the data was stored by the data generation service in the first data block.

19. A method comprising:
initializing, by a processor, a programmable number of data blocks in a location in memory each accessible to a data generation service and a data analysis service, the programmable number of data blocks including at least a first data block and a second data block;
receiving, by the processor during a first time window, a first set of data;
storing, via the data generation service by the processor during the first time window, the first set of data in the first data block as the processor receives the first set of data;
processing, via the data analysis service by the processor during a second time window subsequent to the first time window, the first set of data from the first data block to generate one or more alerts or key performance indicators (KPIs); and
while processing the first set of data via the data analysis service:
receiving, by the processor during the second time window, a second set of data; and
storing, via the data generation service by the processor during the second time window, the second set of data in the second data block as the processor receives the second set of data.

20. The method of claim 19, wherein processing the first set of data in the first data block comprises:
querying, via the data analysis service by the processor, the first data block without transforming or converting any data in the first data block from a format in which the data was stored by the data generation service in the first data block.

* * * * *